US012640890B2

(12) United States Patent
Li

(10) Patent No.: US 12,640,890 B2
(45) Date of Patent: May 26, 2026

(54) TRANSMISSION METHOD AND APPARATUS

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 319 days.

(21) Appl. No.: 18/253,550

(22) PCT Filed: Nov. 23, 2020

(86) PCT No.: PCT/CN2020/130894
§ 371 (c)(1),
(2) Date: May 18, 2023

(87) PCT Pub. No.: WO2022/104797
PCT Pub. Date: May 27, 2022

(65) Prior Publication Data
US 2023/0421335 A1 Dec. 28, 2023

(51) Int. Cl.
*H04L 5/00* (2006.01)
*H04W 72/23* (2023.01)
(52) U.S. Cl.
CPC .......... *H04L 5/0091* (2013.01); *H04L 5/0053* (2013.01); *H04W 72/23* (2023.01)
(58) Field of Classification Search
CPC ... H04L 5/0048; H04L 5/0023; H04L 5/0091; H04L 5/0053; H04L 5/0094
See application file for complete search history.

(56) References Cited

U.S. PATENT DOCUMENTS

| | | | | |
|---|---|---|---|---|
| 2020/0053757 A1* | 2/2020 | Bagheri | .................... | H04L 5/10 |
| 2020/0229161 A1 | 7/2020 | Raghavan et al. | | |
| 2020/0266919 A1 | 8/2020 | Khoshnevisan et al. | | |
| 2020/0413469 A1* | 12/2020 | Wu | ........................ | H04W 36/06 |
| 2021/0168742 A1* | 6/2021 | Li | ........................ | H04W 80/02 |
| 2021/0259001 A1* | 8/2021 | Park | .................. | H04W 72/0453 |
| 2021/0321442 A1* | 10/2021 | Jung | ....................... | H04L 5/005 |

(Continued)

FOREIGN PATENT DOCUMENTS

| | | |
|---|---|---|
| CN | 110474751 A | 11/2019 |
| CN | 111147211 A | 5/2020 |

(Continued)

OTHER PUBLICATIONS

International Search Report and Written Opinion of International Application No. PCT/CN2020/130894, mailed Aug. 19, 2021, 13 pages.

(Continued)

*Primary Examiner* — Andrew Lee
(74) *Attorney, Agent, or Firm* — Finnegan, Henderson, Farabow, Garrett & Dunner, L.L.P.

(57) ABSTRACT

A transmission method is performed by user equipment (UE), and includes: receiving indication information sent by a network device, wherein the indication information is configured to indicate one or more target Transmission Configuration Indication (TCI) states used by the UE for receiving a control signaling carried on a Physical Downlink Control Channel (PDCCH); and receiving the control signaling based on the indication information.

20 Claims, 8 Drawing Sheets receive indication information sent by a network device, the indication information is configured to indicate one or more target TCI states used by the UE for receiving a control signaling carried on a PDCCH ———— S201 determine one or more target TCI state identifiers of the one or more target TCI states based on the indication information ———— S202 determine one or more reference signals corresponding to the one or more target TCI state identifiers, and receive the control signaling by adopting one or more beams corresponding to the one or more reference signals ———— S203

(56)         References Cited

U.S. PATENT DOCUMENTS

| | | | |
|---|---|---|---|
| 2023/0140502 A1* | 5/2023 | Guan ................... | H04B 7/0626 |
| | | | 375/262 |
| 2023/0188197 A1* | 6/2023 | Zhang ................. | H04B 7/0634 |
| | | | 370/329 |
| 2023/0291525 A1* | 9/2023 | Zhou ....................... | H04B 7/088 |
| 2023/0413287 A1* | 12/2023 | Matsumura .............. | H04L 1/08 |

FOREIGN PATENT DOCUMENTS

| | | | |
|---|---|---|---|
| CN | 111327411 A | 6/2020 |
| CN | 111344994 A | 6/2020 |
| CN | 111431685 A | 7/2020 |
| CN | 111436147 A | 7/2020 |
| EP | 3713140 A1 | 9/2020 |
| KR | 20190133977 A | 12/2019 |

OTHER PUBLICATIONS

Nokia, Nokia Shanghai Bell, "Enhancements for Multi-TRP URLLC schemes", 3GPP TSG RAN WG1 #102 Meeting, R1-2006844, e-Meeting, Aug. 17-28, 2020, 8 pages.
Examination Report for Indian Application No. 202347041656, dated Apr. 2, 2026, 7 pages.

* cited by examiner

S101 receive indication information sent by a network device, the indication information is configured to indicate one or more target TCI states used by the UE for receiving a control signaling carried on a PDCCH

S102 receive the control signaling based on the indication information

FIG. 1

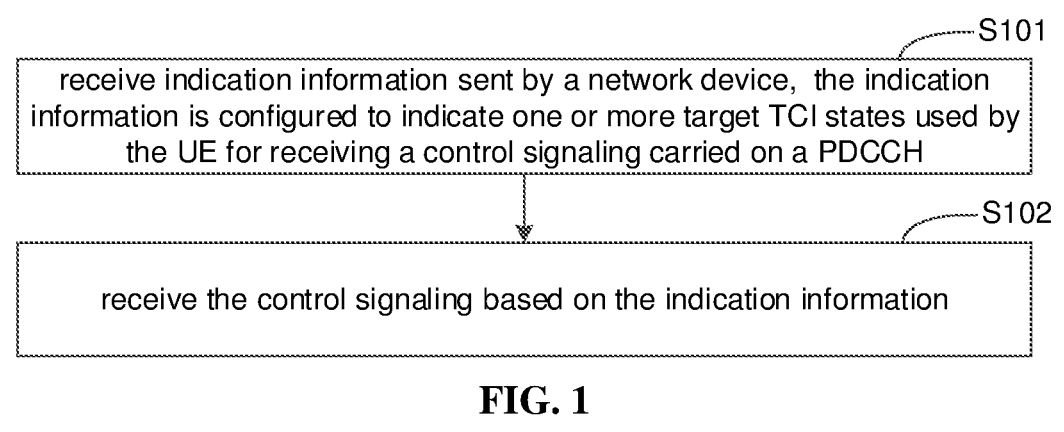

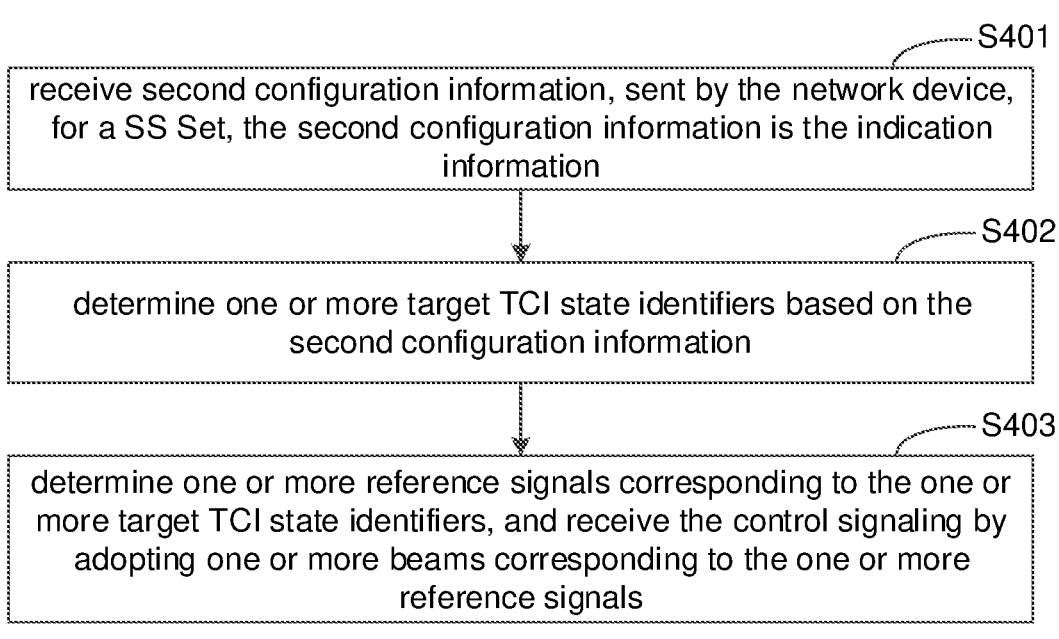

~S401 receive second configuration information, sent by the network device, for a SS Set, the second configuration information is the indication information

~S402 determine one or more target TCI state identifiers based on the second configuration information

~S403 determine one or more reference signals corresponding to the one or more target TCI state identifiers, and receive the control signaling by adopting one or more beams corresponding to the one or more reference signals

FIG. 4

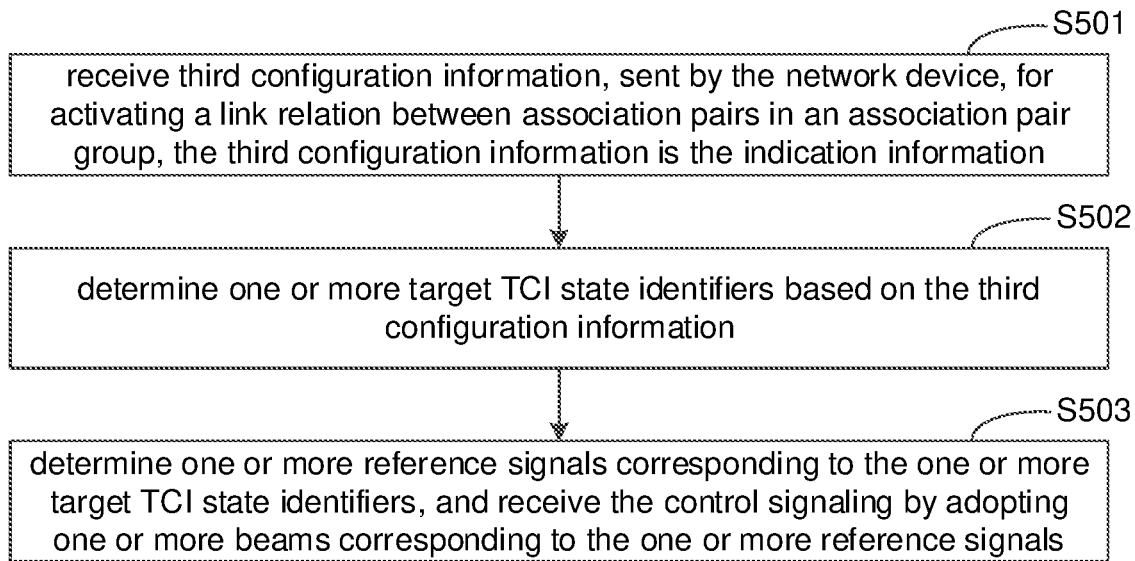

~S501 receive third configuration information, sent by the network device, for activating a link relation between association pairs in an association pair group, the third configuration information is the indication information

~S502 determine one or more target TCI state identifiers based on the third configuration information

~S503 determine one or more reference signals corresponding to the one or more target TCI state identifiers, and receive the control signaling by adopting one or more beams corresponding to the one or more reference signals

FIG. 5

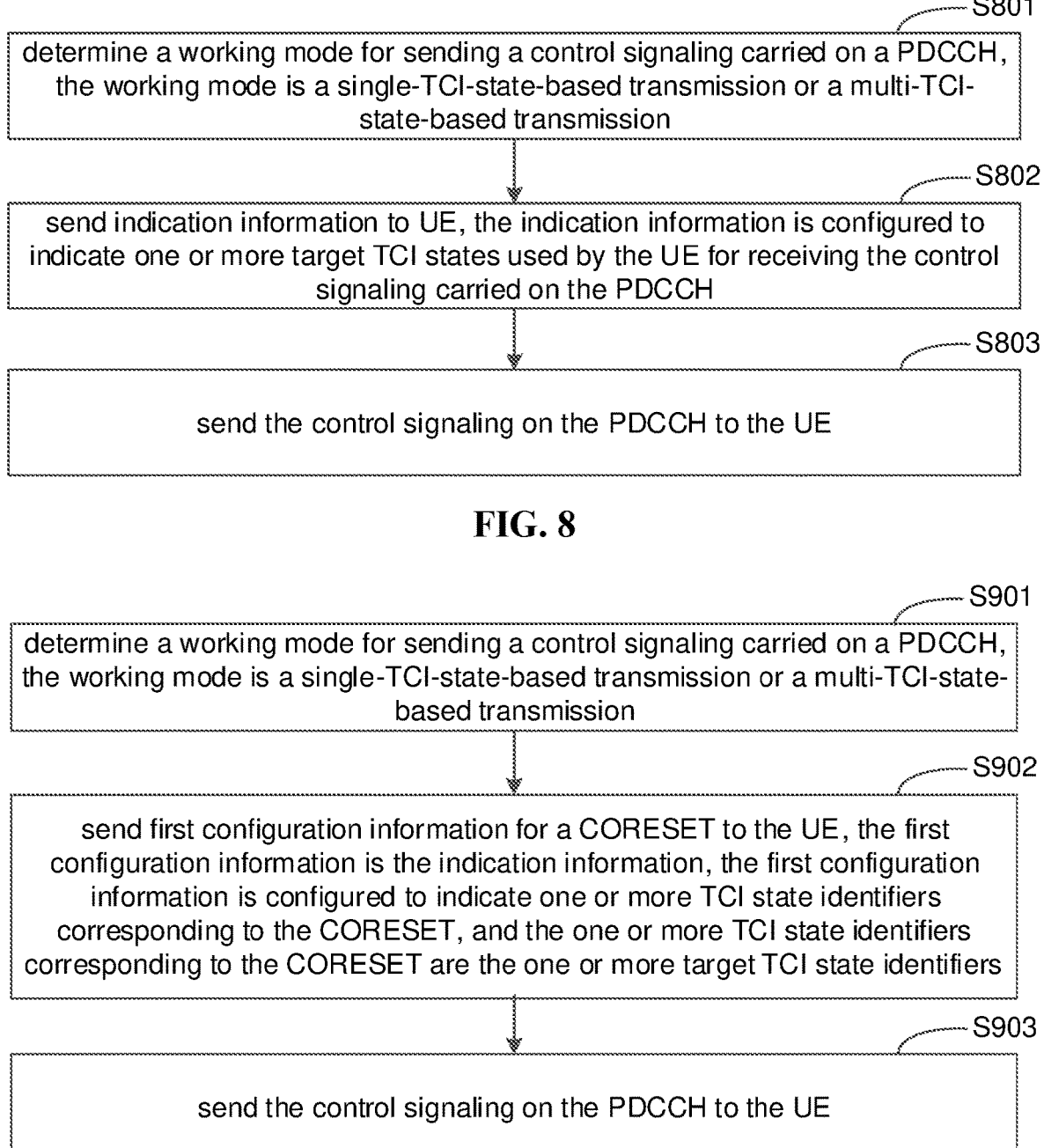

S801 determine a working mode for sending a control signaling carried on a PDCCH, the working mode is a single-TCI-state-based transmission or a multi-TCI-state-based transmission

S802 send indication information to UE, the indication information is configured to indicate one or more target TCI states used by the UE for receiving the control signaling carried on the PDCCH

S803 send the control signaling on the PDCCH to the UE

FIG. 8

S901 determine a working mode for sending a control signaling carried on a PDCCH, the working mode is a single-TCI-state-based transmission or a multi-TCI-state-based transmission

S902 send first configuration information for a CORESET to the UE, the first configuration information is the indication information, the first configuration information is configured to indicate one or more TCI state identifiers corresponding to the CORESET, and the one or more TCI state identifiers corresponding to the CORESET are the one or more target TCI state identifiers

S903 send the control signaling on the PDCCH to the UE

FIG. 9

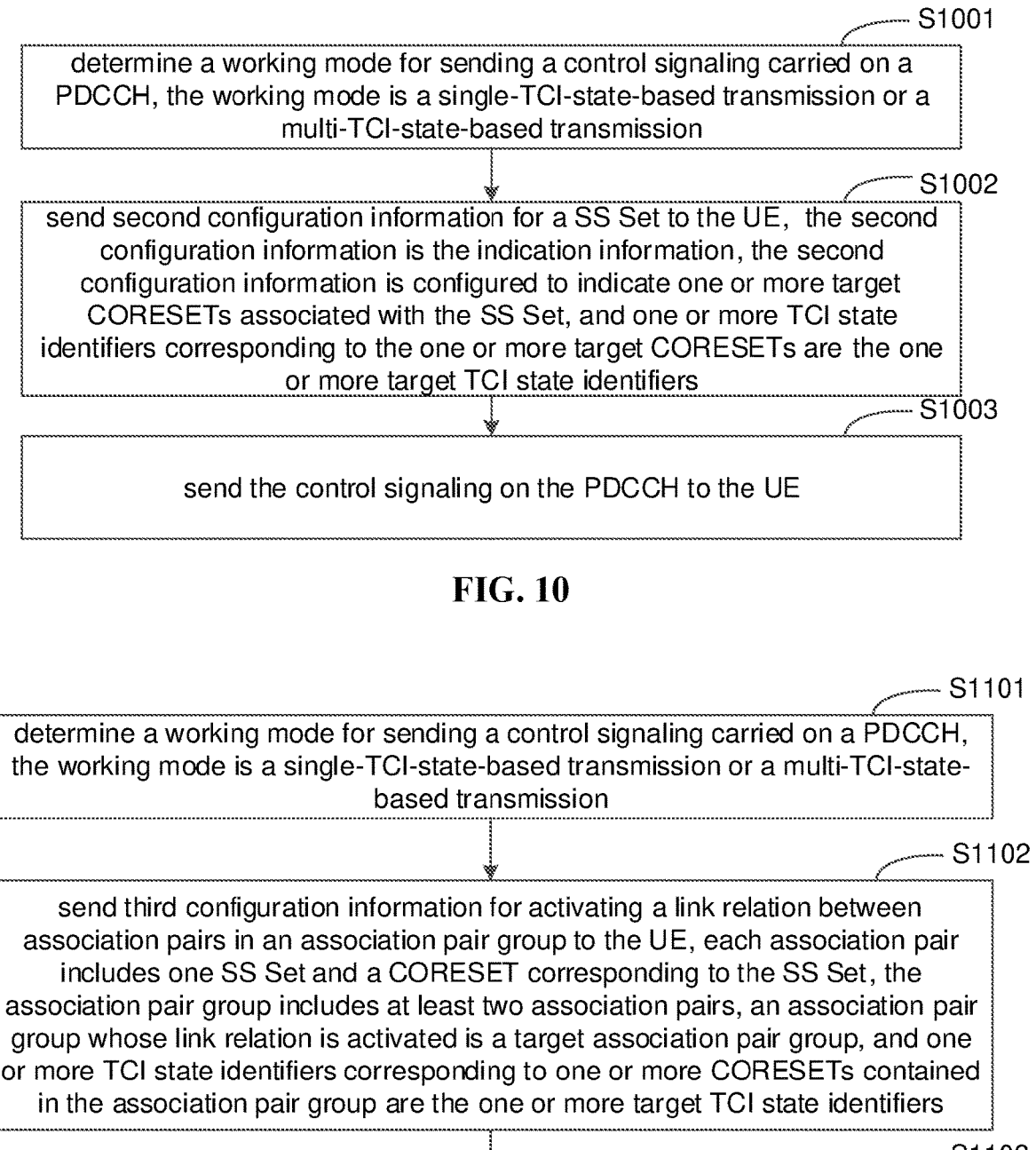

S1001 determine a working mode for sending a control signaling carried on a PDCCH, the working mode is a single-TCI-state-based transmission or a multi-TCI-state-based transmission

S1002 send second configuration information for a SS Set to the UE, the second configuration information is the indication information, the second configuration information is configured to indicate one or more target CORESETs associated with the SS Set, and one or more TCI state identifiers corresponding to the one or more target CORESETs are the one or more target TCI state identifiers

S1003 send the control signaling on the PDCCH to the UE

FIG. 10

S1101 determine a working mode for sending a control signaling carried on a PDCCH, the working mode is a single-TCI-state-based transmission or a multi-TCI-state-based transmission

S1102 send third configuration information for activating a link relation between association pairs in an association pair group to the UE, each association pair includes one SS Set and a CORESET corresponding to the SS Set, the association pair group includes at least two association pairs, an association pair group whose link relation is activated is a target association pair group, and one or more TCI state identifiers corresponding to one or more CORESETs contained in the association pair group are the one or more target TCI state identifiers

S1103 send the control signaling on the PDCCH to the UE

FIG. 11

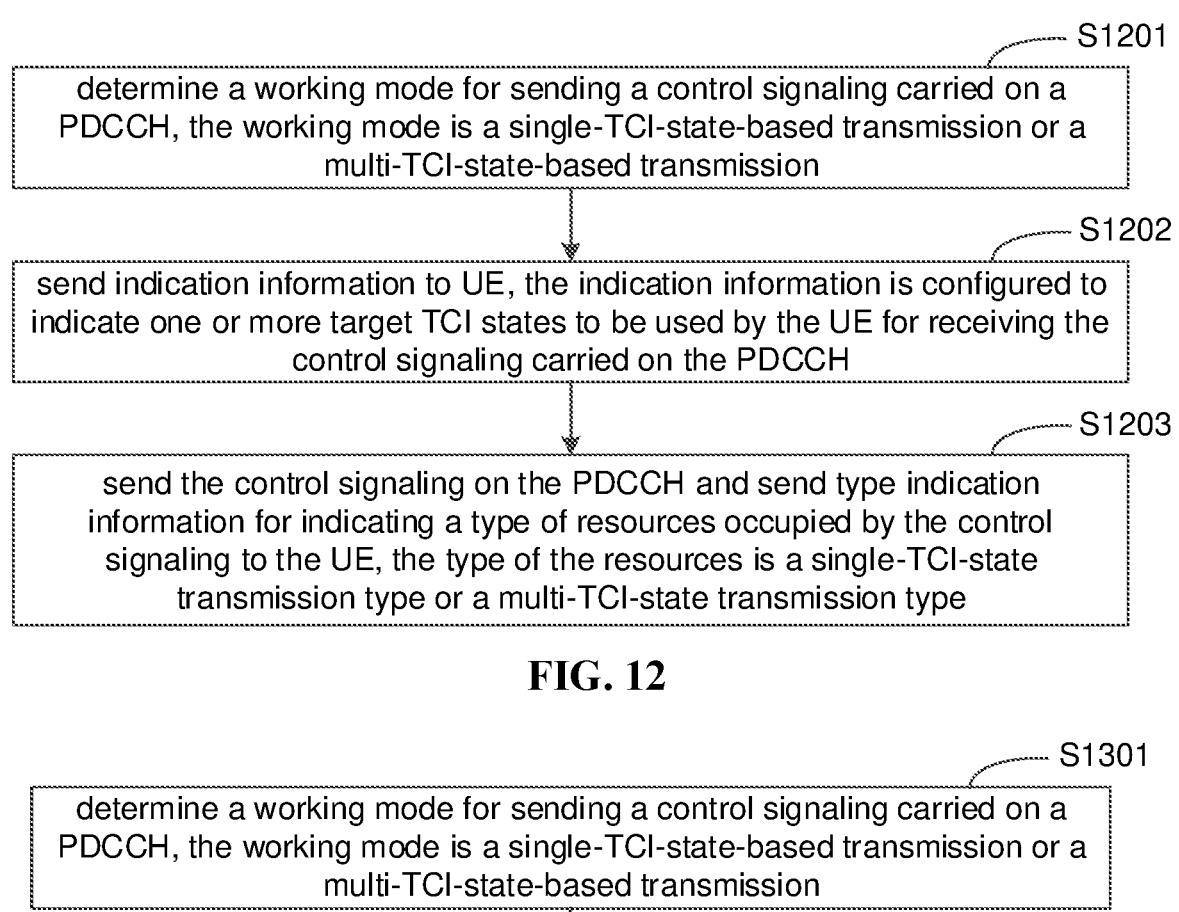

S1201 determine a working mode for sending a control signaling carried on a PDCCH, the working mode is a single-TCI-state-based transmission or a multi-TCI-state-based transmission

S1202 send indication information to UE, the indication information is configured to indicate one or more target TCI states to be used by the UE for receiving the control signaling carried on the PDCCH

S1203 send the control signaling on the PDCCH and send type indication information for indicating a type of resources occupied by the control signaling to the UE, the type of the resources is a single-TCI-state transmission type or a multi-TCI-state transmission type

FIG. 12

S1301 determine a working mode for sending a control signaling carried on a PDCCH, the working mode is a single-TCI-state-based transmission or a multi-TCI-state-based transmission

S1302 send indication information to UE, the indication information is configured to indicate one or more target TCI states to be used by the UE for receiving the control signaling carried on the PDCCH

S1303 send the control signaling on the PDCCH and send an association relation between resources occupied by the control signaling sent by the network device, a type of resources having the association is a multi-TCI-state transmission type, and a type of resources not having the association is a single-TCI-state transmission type

FIG. 13

TRANSMISSION METHOD AND APPARATUS

CROSS-REFERENCE TO RELATED APPLICATION

This application is a U.S. national phase application of International Application No. PCT/CN2020/130894, filed on Nov. 23, 2020, the content of which is hereby incorporated by reference in its entirety.

TECHNICAL FIELD

The disclosure relates to a field of mobile communication technologies, and in particular, relates to transmission methods and transmission apparatuses.

BACKGROUND

As the frequency band of electromagnetic waves used in mobile communication continues to increase, for the purpose of ensuring network coverage, beam-based transmission and reception need to be used. In the related art, the working mode of the Transmission Reception Point (TRP) includes a single-TRP transmission mode and a multi-TRP transmission mode. The network device and user equipment (UE) currently perform mobile communication based on a fixed TRP working mode that is agreed between the network device and the UE, resulting in poor flexibility of the transmission mode between the UE and the network device.

SUMMARY

According to a first aspect of embodiments of the disclosure, a transmission method is provided. The method is performed by user equipment (UE). The method includes: receiving indication information sent by a network device; in which indication information is configured to indicate one or more target Transmission Configuration Indication (TCI) states used by the UE for receiving a control signaling carried on a Physical Downlink Control Channel (PDCCH); and receiving the control signaling based on the indication information.

According to a second aspect of embodiments of the disclosure, a transmission method is provided. The method is performed by a network device. The method includes: determining a working mode for sending a control signaling carried on a Physical Downlink Control Channel (PDCCH); in which the working mode is a single-Transmission Configuration Indication (TCI)-state-based transmission or a multi-TCI-state-based transmission; sending indication information to user equipment (UE), in which the indication information is configured to indicate one or more target TCI states used by the UE for receiving the control signaling carried on the PDCCH; and sending the control signaling on the PDCCH to the UE.

According to a third aspect of embodiments of the disclosure, a communication device is provided. The device includes: at least one processor; and a memory communicatively connected to the at least one processor; in which the memory has instructions executable by the at least one processor stored thereon, the instructions are executed by the at least one processor to cause the at least one processor to perform the transmission method according to the first aspect of embodiments of the disclosure or the transmission method according to the second aspect of embodiments of the disclosure.

BRIEF DESCRIPTION OF THE DRAWINGS

Example embodiments will be described in detail below in conjunction with the accompanying drawings.

FIG. 1 is a schematic flowchart illustrating a transmission method according to some embodiments of the disclosure.

FIG. 4 is a schematic flowchart illustrating another transmission method according to some embodiments of the disclosure.

FIG. 5 is a schematic flowchart illustrating another transmission method according to some embodiments of the disclosure.

FIG. 8 is a schematic flowchart illustrating another transmission method according to some embodiments of the disclosure.

FIG. 9 is a schematic flowchart illustrating another transmission method according to some embodiments of the disclosure.

FIG. 10 is a schematic flowchart illustrating another transmission method according to some embodiments of the disclosure.

FIG. 11 is a schematic flowchart illustrating another transmission method according to some embodiments of the disclosure.

FIG. 12 is a schematic flowchart illustrating another transmission method according to some embodiments of the disclosure.

FIG. 13 is a schematic flowchart illustrating another transmission method according to some embodiments of the disclosure.

DETAILED DESCRIPTION

Figure 2:
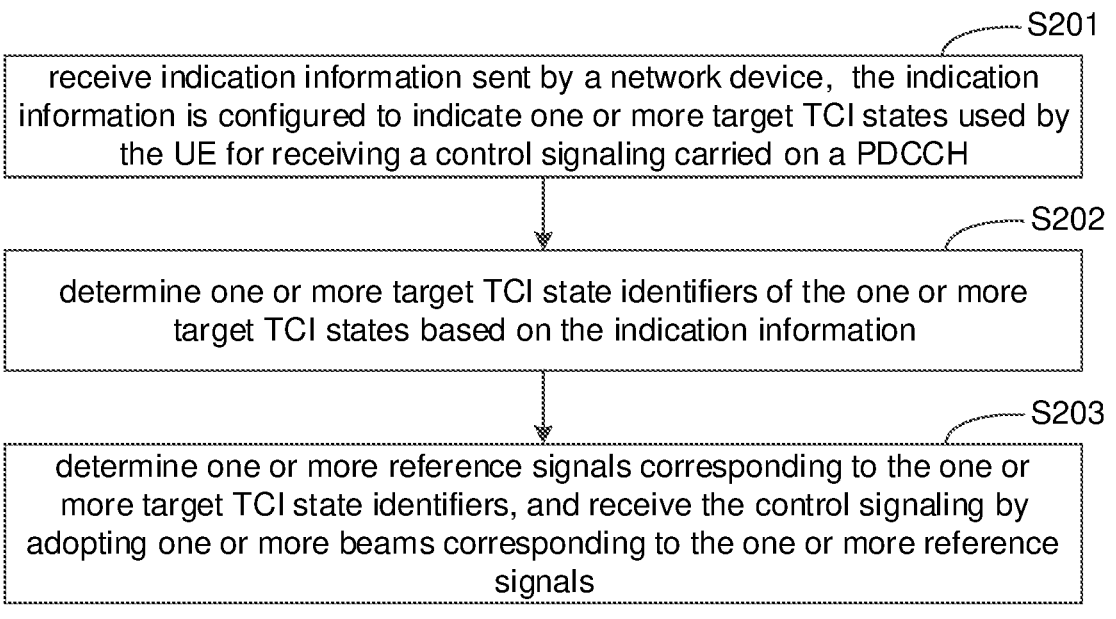
FIG. 2 is a schematic flowchart illustrating another transmission method according to some embodiments of the disclosure.

Embodiments of the disclosure will be described in detail below, examples of which are illustrated in the accompanying drawings, where the same or similar reference numerals refer to the same or similar elements, or refer to elements having the same or similar functions, throughout the disclosure. Embodiments described below with reference to the accompanying drawings are only examples, and are intended to be used to explain the disclosure, but should not be construed as a limitation to the disclosure.

In the related art, the network device performs mobile communication with the user equipment (UE) according to a fixed Transmission Reception Point (TRP) working mode, such as either the single-TRP transmission type or the multi-TRP transmission type. However, the network device cannot flexibly switch between these two transmission types to perform the mobile communication with the UE, resulting in a relatively low transmission flexibility between the network device and the UE.

To address the above-mentioned problem, embodiments of the disclosure provide the following transmission methods and devices.

FIG. 1 is a schematic flowchart illustrating a data transmission method according to some embodiments of the disclosure. The method is performed by the UE. With the method, the UE can flexibly communicate with the network device on the Physical Downlink Control Channel (PDCCH) based on the multi-TRP transmission type or the single-TRP transmission type. As illustrated in FIG. 1, the transmission method includes the following.

At block S101, indication information sent by a network device is received. The indication information is configured to indicate one or more target Transmission Configuration Indication (TCI) states used by the UE for receiving a control signaling carried on the PDCCH.

The network device is deployed in a wireless access network to provide wireless access functions for the UE. The network device may be a Base Station (BS). The network device may wirelessly communicate with the UE via one or more antennas. The network device can provide communication coverage for its geographic area. The BS may be any type, such as macro base station, micro base station, relay station, and access point. In some embodiments, the base station may also be referred to by those skilled in the art as a base station transceiver, a wireless base station, an access point, a wireless transceiver, a Basic Service Set (BSS), an Extended Service Set (ESS), a NodeB, an evolved NodeB (eNB or eNodeB) or another appropriate term. For example, in the 5$^{th}$ Generation Mobile Communication Technology (5G) system, the base station is called a gNB. For convenience of description, in embodiments of the disclosure, the above-mentioned devices for providing wireless communication functions for the UE are collectively referred to as the network device.

The UEs may be distributed throughout the mobile communication system, and each UE may be stationary or mobile. The UE may also be referred to by those skilled in the art as a mobile station, a subscriber station, a mobile unit, a subscriber unit, a wireless unit, a remote unit, a mobile device, a terminal device, a wireless device, a wireless communication device, a remote device, a mobile subscriber station, an access UE, a mobile UE, a wireless UE, a remote UE, a handheld device, a user agent, a mobile client, a client, or another appropriate term. The UE may be a cellular phone, a Personal Digital Assistant (PDA), a wireless modem, a wireless communication device, a handheld device, a tablet computer, a laptop computer, a cordless phone, a Wireless Local Loop (WLL) station, which can communicate with the network device in the mobile communication system.

In some embodiments of the disclosure, the indication information may be configuration information or other information transmitted on the Physical Broadcast Channel (PBCH) and/or the PDCCH and/or the Physical Downlink Shared Channel (PDSCH). For example, the indication information may be configuration information for a Control Resource Set (CORESET) and/or a Search Space Set (SS set). A respective target TCI state identifier of each target Transmission Configuration Indication (TCI) can be determined based on the configuration information for the CORESET and/or the SS set. In some embodiments, the indication information may be a configuration signaling, a control signaling or another signaling transmitted through the PBCH and/or PDCCH and/or PDSCH. Alternatively, the indication information may be a signaling composed of multiple signaling and sent to the UE. The specific form of the indication information is not limited in the disclosure.

The indication information is configured to indicate one or more TCI states used by the UE for receiving the control signaling carried on a physical downlink channel. In other words, the indication information can indicate whether one target TCI state or multiple target TCI states will be used by the UE for receiving the control signaling. In some embodiments of the disclosure, the control signaling carried on the PDCCH may be a Downlink Control Information (DCI) signaling or any other signaling. In embodiments of the disclosure, the specific form of the control signaling carried on the PDCCH is not limited.

The indication information is determined by the network device according to the working mode adopted by itself. The working mode is either a single-TCI-state-based transmission or a multi-TCI-state-based transmission. In embodiments of the disclosure, the single-TCI-state-based transmission means that the network device performs the transmission with the UE based on a single TRP. The multi-TCI-state-based transmission means that the network device performs the transmission with the UE based on multiple TRPs.

If the working mode adopted by the network device is the single-TRP-based transmission, the indication information is configured to indicate one target TCI state used by the UE for receiving the control signaling carried on the PDCCH. If the working mode adopted by the network device is the multi-TRP-based transmission, the indication information is configured to indicate multiple target TCI states used by the UE for receiving the control signaling carried on the PDCCH.

It is understandable that the above-mentioned "multiple TRPs" can specifically be, for example, two TRPs. This is because currently in the related art of transmission cooperation based on multiple TRPs, the number of TRPs is limited to a maximum of 2. The embodiments of the disclosure can be applied to a case of more TRPs, which is not limited.

At block S102, the control signaling is received based on the indication information.

In some embodiments of the disclosure, after obtaining the indication information, the UE may determine, based on the one or more target TCI states indicated by the indication information, whether the network device adopts the single TRP-based transmission or the multi-TRP-based transmission. In the case that the UE determines that the network device adopts the multi-TRP-based transmission, the UE receives the control signaling by adopting the multiple target TCI states indicated by the indication information. In the case that the UE determines that the network device adopts the single-TRP-based transmission, the UE receives the control signaling by adopting the one target TCI state indicated by the indication information. In this way, the UE can flexibly adopts either one target TCI state or more target TCI states to receive the control signaling according to the working mode adopted by the network device.

In embodiments of the disclosure, the indication information sent by the network device is received, where the indication information is configured to indicate one or more target TCI states used by the UE for receiving the control signaling carried on the PDCCH. The control signaling carried on the PDCCH is received based on the indication information. In embodiments of the disclosure, when the network device flexibly switches between the multi-TRP-based transmission mode and the single-TRP-based transmission mode, the UE can receive the indication information from the network device and the UE can receive the control signaling by using either a single TCI state or multiple TCI states which is matched with the working mode adopted by the network device. In other words, one TCI state or more TCI states are used based on the working mode adopted by the network device, to receive the control signaling, which realizes the matching between the working mode adopted by the network device and the working mode adopted by the UE, ensures that the UE can correctly receive and decode the control signaling, and improves the decoding success rate of the control signaling.

Embodiments of the disclosure provide another transmission method. FIG. 2 is a schematic flowchart illustrating another transmission method according to some embodiments of the disclosure. The method is performed by the UE. With the method, the UE receives the indication information sent by the network device. The UE determines, based on the indication information, one or more target TCI state identifiers of the one or more target TCI states used. The UE determines one or more reference signal based on the one or more target TCI state identifiers. The UE determines one or more beams based on the one or more reference signals. The UE receives the control signaling carried on the PDCCH through the one or more beams.

At block S201, indication information sent by a network device is received. The indication information is configured to indicate one or more target TCI states used by the UE for receiving the control signaling carried on the PDCCH.

In embodiments of the disclosure, the block S201 can be implemented in any one way described in embodiments of the disclosure, which is not limited in embodiments of the disclosure and will not be described again.

At block S202, one or more target TCI state identifiers of the one or more target TCI states are determined based on the indication information.

The indication information may be the configuration information for the CORESET and/or the SS set. A respective target TCI state identifier of each target TCI state can be determined based on the configuration information for the CORESET and/or the SS set.

As a possible implementation, the indication information may be first configuration information for the CORESET. In the first configuration information of the CORESET, the CORESET is configured with one or more TCI state identifiers of one or more TCI states. After obtaining the first configuration information, the UE obtain the one or more TCI state identifiers corresponding to the CORESET from the first configuration information for the CORESET, and use the one or more TCI state identifiers corresponding to the CORESET as the one or more target TCI state identifiers.

As another possible implementation, the indication information may be second configuration information for the SS set. The second configuration information is configured to indicate one or more CORESETs associated with the SS set. Each CORESET corresponds to one TCI state identifier. The TCI state identifier corresponding to the CORESET may be sent to the UE by carrying the TCI state identifier in the configuration information for the CORESET. Alternatively, the configuration information for the CORESET may be sent by the network device to the UE before or after sending the second configuration information. Alternatively, the configuration information for the CORESET may be sent by the network device to the UE in synchronization with sending the second configuration information.

After obtaining the second configuration information, the UE can obtain one or more CORESETs associated with the SS set. The UE can obtain, based on the configuration information for the one or more CORESETs, TCI state identifiers corresponding to all CORESETs. The UE determines one or more TCI state identifiers corresponding to the one or more CORESETs associated with the SS set as the one or more target TCI state identifiers.

As another possible implementation, the indication information may be third configuration information for activating a link relation between association pairs contained in an association pair group. One SS set and one CORESET associated with the SS set form one association pair, and two or more association pairs form one association pair group. The association pairs within the association pair group may have the link relation and the link relation are activated through the third configuration information.

After acquiring the third configuration information, the UE may acquire an association pair group whose link relation is activated. In embodiments of the disclosure, an association pair group whose link relation is activated is called a target association pair group. The UE can obtain the CORESET associated with the SS set included in each association pair in the target association pair group and obtain the TCI state identifier corresponding to the CORESET based on the configuration information for the CORESET associated with the SS set. The UE determines the TCI state identifier corresponding to the CORESET associated with the SS set included in the association pair as the target TCI state identifier. In some examples, the configuration information for the CORESET associated with the SS set contained in the association pair may be sent by the network device to the UE before or after sending the third configuration information. In some examples, the configuration information for the CORESET included in the association pair may be sent by the network device to the UE in synchronization with sending the third configuration information.

For instances, there are SS set 1, SS set 2, SS set 3, SS set 4, CORESET 1, CORESET 2, CORESET 3 and CORESET 4. In this instance, the SS set 1 and the CORESET 1 associated with the SS set 1 form the association pair 1, the SS set 2 and the CORESET 2 associated with the SS set 2 forms the association pair 2, the SS set 3 and the CORESET 3 associated with the SS set 3 form the association pair 3 with, and the SS set 4 and the CORESET 4 associated with the SS set 4 form forms the association pair 4. The association pair 1 to the association pair 4 may have link relations with each other, and the link relations can be activated through the third configuration information. For example, the association pair 1 and the association pair 2 form the association pair group 1, and the association pair 3 and the association pair 4 form the association pair group 2. If the third configuration information is configured to activate the association pair group 1, then the association pair group 1 is the target association pair group, and the link relation between the association pair 1 and the association pair 2 in the association pair group 1 is activated. Correspondingly, the UE determines the TCI state identifier corresponding to the CORESET 1 in the association pair 1 and the TCI state identifier corresponding to the CORESET 2 in the association pair 2 as the target TCI state identifiers.

At block S203, one or more reference signals corresponding to the one or more target TCI state identifiers are determined, and the control signaling is received using one or more beams corresponding to the one or more reference signals.

The network device configures, for the UE, a correspondence between the TCI state identifiers (TCIState ID) and the reference signals (RS) through a Radio Resource Control (RRC) signaling. After obtaining the one or more target TCI state identifiers, the UE queries the correspondence between the TCI state identifiers and the RSs according to the one or more target TCI state identifiers, and obtain the one or more reference signals corresponding to the one or more target TCI state identifiers. Therefore, the UE uses the one or more beams corresponding to the one or more reference signals to receive the control signaling carried on the PDCCH. In some examples, the correspondence between the TCI state identifiers and the RSs may be a TCI table or other forms. The disclosure is described by taking the TCI table as an example. The TCI table may include, for example, TCI state identifiers, reference signals, and the like.

In embodiments of the disclosure, the indication information sent by the network device is received, the indication information is configured to indicate one or more target TCI states used by the UE for receiving the control signaling carried on the PDCCH, and one or more target TCI state identifiers of the one or more target TCI states are determined based on the indication information, one or more reference signals corresponding to one or more target TCI state identifiers are determined, and the control signaling carried on the PDCCH is received using one or more beams corresponding to one or more reference signals. In embodiments of the disclosure, when the network device flexibly switches between the multi-TRP-based transmission mode and the single-TRP-based transmission mode, the UE can receive the indication information from the network device and the UE can receive the control signaling by using either a single TCI state or multiple TCI states which is matched with the working mode adopted by the network device. In other words, one TCI state or more TCI states can be used based on the working mode adopted by the network device, to receive the control signaling, which realizes the matching between the working mode adopted by the network device and the working mode adopted by the UE, ensures that the UE can correctly receive and decode the control signaling, and improves the decoding success rate of the control signaling.

Figure 3:
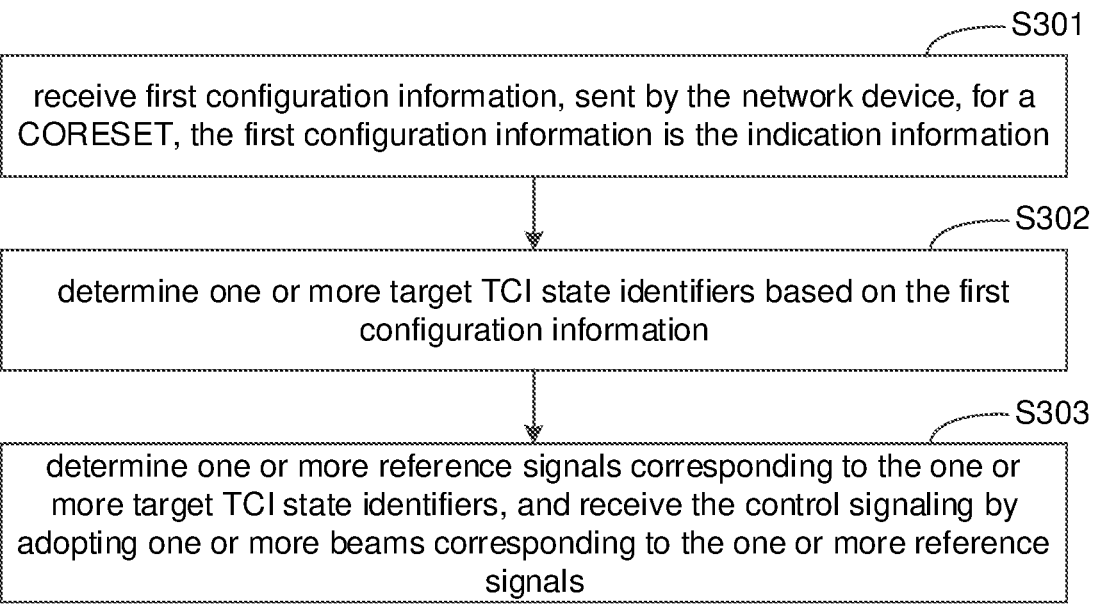
FIG. 3 is a schematic flowchart illustrating another transmission method according to some embodiments of the disclosure.

Embodiments of the disclosure provide another transmission method. FIG. 3 is a schematic flowchart illustrating another transmission method according to embodiments of the disclosure. The method is performed by the UE. With the method, the UE can receive the first configuration information for the CORESET sent by the network device. The first configuration information is used as the indication information. It is determined, based on the first configuration information, whether to use one TCI state or multiple TCI states to receive the control signaling carried on the PDCCH.

At block S301, first configuration information for a CORESET sent by a network device is received. The first configuration information is the indication information.

The first configuration information is configured to indicate one or more TCI state identifiers corresponding to the CORESET. In embodiments of the disclosure, the first configuration information may be transmitted through at least one of the RRC signaling, the Medium Access Control Address Control Element (MAC CE) signaling, or the DCI signaling.

As another possible implementation, the first configuration information may be transmitted through the RRC signaling, the MAC CE signaling, or the DCI signaling separately. In embodiments of the disclosure, the RRC signaling, the MAC CE signaling or the DCI signaling carries the one or more TCI state identifiers corresponding to the CORESET.

As another possible implementation, the first configuration information may be transmitted through two or more of the RRC signaling, the MAC CE signaling, or the DCI signaling.

Manner 1, the first configuration information is transmitted through a combination of the RRC signaling and the MAC CE signaling. The UE receives the RRC signaling sent by the network device, where the RRC signaling is configured to indicate a first number of TCI state identifiers corresponding to the CORESET, in which the first number is an integer greater than 1. Further, the UE receives the MAC CE signaling sent by the network device, where the MAC CE signaling is configured to active one or more TCI state identifiers among the first number of TCI state identifiers. One or more beams corresponding to the activated one or more TCI state identifiers can be used to receive the control signaling carried on the PDCCH. In some examples, the MAC CE includes multiple bits, each bit corresponds to a respective TCI state identifier, and values of a bit can represent the activation state or inactivation state of the TCI state identifier. For example, if the value of the bit is "1", it means that the TCI state identifier corresponding to this bit is activated, otherwise, it means that the TCI state identifier corresponding to this bit is not activated.

Manner 2, the first configuration information may be transmitted through a combination of the RRC signaling and the DCI signaling. The UE receives the RRC signaling sent by the network device, where the RRC signaling is configured to indicate a second number of TCI state identifiers corresponding to the CORESET, in which the second number is an integer greater than 1. Further, the UE receives the DCI signaling sent by the network device, where the DCI signaling is configured to indicate one or more TCI state identifiers among the second number of TCI state identifiers. One or more beams corresponding to the indicated one or more TCI state identifiers can be used to receive the control signaling carried on the PDCCH. In some examples, the DCI signaling includes multiple bits, each bit corresponds to a respective TCI state identifier, and values of a bit can represent an activation state and an inactivation state of the corresponding TCI state identifier. For example, if the value of a bit is "1", it means that the TCI state identifier corresponding to this bit is activated, otherwise, it means that the TCI state identifier corresponding to this bit is not activated, that is, the TCI state identifier corresponding to this bit is deactivated or inactivated.

Manner 3, the first configuration information may be transmitted through a combination of the RRC signaling, the MAC CE signaling, and the DCI signaling. The UE receives the RRC signaling sent by the network device, where the RRC signaling is configured to indicate a third number of TCI state identifiers corresponding to the CORESET, in which the third number is an integer greater than 1.

Further, the UE receives the MAC CE signaling sent by the network device, where the MAC CE signaling carries an activation indication for the TCI state identifiers, and the activation indication for the TCI state identifiers is configured to activate a fourth number of TCI state identifiers among the third number of TCI state identifiers. The process of activating the fourth number of TCI state identifiers among the third number of TCI state identifiers through the MAC CE signaling is similar to the activation process in Manner 2, which is not repeated here.

Further, the MAC CE signaling also carries a mapping relation between TCI state identifier combinations and code-point values of the TCI state identifier combinations. The TCI state identifier combination includes at least one of the fourth number of TCI state identifiers. The UE receives the DCI signaling sent by the network device, where the DCI signaling carries a codepoint value. It is understandable that since the TCI state identifier combination includes at least one of the fourth number of TCI state identifiers, different numbers of TCI state identifiers may form different TCI state identifier combinations. In embodiments of the disclosure, a respective codepoint value is configured for each TCI state identifier combination, and the mapping relation between the TCI state identifier combinations and the codepoint values are established and sent to the UE through the MAC CE signaling.

In the disclosure, in order to distinguish the mapping relation between the TCI state identifier combinations and the codepoint values of the TCI state identifiers combinations from other mapping relations, this mapping relation is referred to as a first mapping relation, which will not be repeated below. In addition, in order to distinguish the codepoint value carried in the DCI signaling from other codepoint values, this codepoint value is referred to as a first codepoint value, which will not be repeated below.

At block S302, one or more target TCI state identifiers are determined based on the first configuration information.

In some examples, in the case that the first configuration information is transmitted through the RRC signaling, the MAC CE signaling, or the DCI signaling separately, one or more TCI state identifiers corresponding to the CORESET carried by the RRC signaling, the MAC CE signaling or the DCI signaling are determined as the one or more target TCI state identifiers.

In some examples, in the case that the first configuration information is transmitted according to the Manner 1 in this embodiment, one or more TCI state identifiers among the first number of TCI state identifiers activated by the MAC CE signaling are determined as one or more target TCI state identifiers.

In some examples, in the case that the first configuration information is transmitted according to the manner 2, one or more TCI state identifiers among the second number of TCI state identifiers indicated by the DCI signaling are determined as one or more target TCI state identifiers.

In some examples, in the case that the first configuration information is transmitted according to the manner 3, the UE determines the target TCI state identifier combination based on the first codepoint value carried by the DCI signaling and the above-mentioned first mapping relation. For example, the UE queries the above-mentioned first mapping relation according to the first codepoint value carried by the DCI signaling, and obtain a TCI state identifier combination corresponding to the first codepoint value. The TCI state identifier combination corresponding to the first codepoint value can be determined as the target TCI state identifier combination. Further, the one or more target TCI state identifiers are determined based on the target TCI state identifier combination.

For instance, a codepoint value having 3 bits can be 001, 010, 011 . . . . The TCI state identifier combination corresponding to 001 is the combination "A1", the TCI state identifier combination corresponding to 010 is the combination "A2", the TCI state identifier combination corresponding to 011 is the combination "A3", and so on. The combination "A1" includes a TCI state identifier "T1", the combination "A2" includes a TCI state identifier "T1" and a TCI state identifier "T2", and the combination "A3" includes a TCI state identifier "T1" and a TCI state identifier "T3". If the first codepoint value carried by the DCI is 011, then the UE can determine that the target TCI state identifier combination is the combination "A3", and can determine the TCI state identifiers "T1" and "T3" included in the combination "A3" as the target TCI state identifiers.

At block S303, one or more reference signals corresponding to the one or more target TCI state identifiers are determined and one or more beams corresponding to the one or more reference signals are used to receive the control signaling.

In embodiments of the disclosure, the block S303 may be implemented in any ways described in embodiments of the disclosure, which is not limited in embodiments and will not be repeated here.

It is understandable that, for any transmission manner of the first configuration information in embodiments of the disclosure, in response to the first configuration information indicating that the CORESET corresponds to one TCI state identifier, the UE uses a beam corresponding to this TCI state identifier corresponding to the CORESET to receive the control signaling carried on the PDCCH.

In response to the first configuration information indicating that the CORESET corresponds to multiple TCI state identifiers, the UE uses beams corresponding to the multiple TCI state identifiers corresponding to the CORESET to receive the control signaling carried on the PDCCH.

In embodiments of the disclosure, the first configuration information for the CORESET sent by the network device is received, and the first configuration information is used as the indication information to indicate the UE to use either one target TCI state or multiple target TCI states for receiving the control signaling carried on the PDCCH. The UE determines the one or more target TCI state identifiers based on the first configuration information, determines one or more reference signals corresponding to the one or more target TCI state identifiers, and receives the control signaling carried on the PDCCH by adopting one or more beams corresponding to the one or more reference signals. In embodiments of the disclosure, when the network device flexibly switches between the multi-TRP-based transmission mode and the single-TRP-based transmission mode, the UE can receive the indication information from the network device and the UE can receive the control signaling by using either a single TCI state or multiple TCI states which is matched with the working mode adopted by the network device. In other words, one TCI state or more TCI states are used based on the working mode adopted by the network device, to receive the control signaling, which realizes the matching between the working mode adopted by the network device and the working mode adopted by the UE, ensures that the UE can correctly receive and decode the control signaling, and improves the decoding success rate of the control signaling.

Embodiments of the disclosure provide another transmission method. FIG. 4 is a schematic flowchart illustrating another transmission method according to embodiments of the disclosure. The method is performed by the UE. With the method, the UE can receive second configuration information for the SS set sent by the network device. The second configuration information is used as the indication information. It is determined whether to use one target TCI state or multiple target TCI states to receive the control signaling carried on the PDCCH through the second configuration information.

At block S401, second configuration information for a SS set sent by a network device is received. The second configuration information is the indication information.

The second configuration information is configured to indicate one or more CORESETs associated with the SS set.

In embodiments of the disclosure, the second configuration information may be transmitted through at least one of the RRC signaling, the MAC CE signaling, or the DCI signaling.

As another possible implementation, the second configuration information may be transmitted through the RRC signaling, the MAC CE signaling, or the DCI signaling separately. In embodiments of the disclosure, the RRC signaling, the MAC CE signaling or the DCI signaling carries one or more target CORESETs associated with the SS set.

As another possible implementation, the second configuration information may be transmitted through a combination of two or more of the RRC signaling, the MAC CE signaling, and the DCI signaling.

Manner 1, the second configuration information may be transmitted through a combination of the RRC signaling and the MAC CE signaling. The UE receives the RRC signaling sent by the network device, where the RRC signaling is configured to indicate a fifth number of CORESETs associated with the SS set, in which the fifth number is an integer greater than 1. In implementation, it is possible that the SS set is associated with the fifth number of CORESETs, and a further indication is needed to determine whether the SS set is associated with these fifth number of CORESETs. Further, the UE receives the MAC CE signaling sent by the network device, where the MAC CE signaling is configured to activate one or more target CORESET identifiers of the one or more target CORESETs among the fifth number of CORESETs. In embodiments of the disclosure, one or more beams corresponding to the TCI state identifiers corresponding to the activated one or more CORESET identifiers may be used to receive the control signaling carried on the PDCCH. For example, the MAC CE includes multiple bits, each bit corresponds to a respective CORESET identifier, and values of the bit can represent an activation state and an inactivation state of the CORESET identifier. For example, if the value of a bit is "1", it means that the CORESET identifier corresponding to this bit is activated, otherwise it means that the CORESET identifier corresponding to this bit is not activated.

Manner 2, the second configuration information may be transmitted through a combination of the RRC signaling and the DCI signaling. The UE receives the RRC signaling sent by the network device, where the RRC signaling is configured to indicate a sixth number of CORESETs corresponding to the SS set, in which the sixth number is an integer greater than 1. In practice, it is possible that the SS set is associated with the sixth number of CORESETs, and a further indication is needed to determine whether the SS set is associated with the sixth number of CORESETs. Further, the UE receives the DCI signaling sent by the network device, where the DCI signaling is configured to indicate one or more target CORESET identifiers of one or more target CORESETs among the sixth number of CORESETs. In embodiments of the disclosure, one or more beams corresponding to one or more TCI state identifiers corresponding to the indicated one or more target CORESET identifiers may be used to receive the control signaling carried on the PDCCH. For example, the DCI signaling includes multiple bits, each bit corresponds to a respective CORESET identifier, and values of a bit may represent an activation state and an inactivation state of the corresponding CORESET identifier. For example, if the value of a bit is "1", it indicates that the CORESET identifier corresponding to this bit is activated; otherwise, it indicates that the CORESET identifier corresponding to this bit is not activated.

vated, that is, the CORESET identifier corresponding to this bit is deactivated or inactivated.

Manner 3, the second configuration information may be transmitted through a combination of the RRC signaling and one or both of the MAC CE signaling and the DCI signaling. The UE receives the RRC signaling sent by the network device, where the RRC signaling is configured to indicate one target CORESET associated with the SS set. In embodiments of the disclosure, the target CORESET is always associated with the SS set by default, unless the RRC signaling is reconfigured. For example, a CORESET with a smaller CORESET identifier may be configured as the target CORESET that is always associated with the SS set by default.

Further, the RRC signaling is also configured to indicate one or more other possible CORESETs that may be associated with the SS set. In the implementation, a further indication is needed to determine whether the SS set is associated with the one or more other possible CORESETs. Further, the UE receives the MAC CE signaling and/or the DCI signaling sent by the network device, where the MAC CE signaling and/or the DCI signaling are configured to indicate activation information for association relations between the SS set and the one or more other possible CORESETs. In embodiments of the disclosure, a CORESET whose association relation is activated is determined as the target CORESET. For example, the MAC CE signaling or the DCI signaling contains multiple bits, each bit corresponds to a respective CORESET identifier of a possible CORESET among the other possible CORESETs, and values of a bit can be configured to represent the activation information for an association relation between the SS set and the CORESET identifier. The activation information can represent an activation state for the association relation.

For instance, the RRC signaling indicates that two CORESETs are associated with the SS set, one of which is the default target CORESET that is always associated with the SS set, and the other is activated by the MAC CE signaling or the DCI signaling. The MAC CE signaling contains 1 bit and this 1 bit corresponds to the CORESET identifier (ID) of the possible CORESET. When the value of this bit is "1", it means that the association relation between the SS set and the possible CORESET is activated, otherwise it means that the association relation is not activated. Similarly, the DCI signaling contains 1 bit and this bit corresponds to the CORESET ID of the possible CORESET. When the value of this bit is "1", it means that the association relation between the SS set and the possible CORESET is activated, otherwise it indicates that the association relation is not activated.

Manner 4, the second configuration information may be transmitted through a combination of the RRC signaling, the MAC CE signaling, and the DCI signaling. The UE receives the RRC signaling sent by the network device, where the RRC signaling is configured to indicate an eighth number of CORESETs associated with the SS set. In practice, it is possible that the SS set is associated with the eighth number of CORESETs, and a further indication is needed to determine whether the SS set is associated with the eighth number of CORESETs. Further, the UE receives the MAC CE signaling sent by the network device, where the MAC CE signaling carries a CORESET activation indication. The CORESET activation indication is configured to activate a ninth number of CORESET identifiers of the ninth number of CORESETs among the eighth number of CORESETs. The process of activating the ninth number of CORESET identifiers of the ninth number of CORESETs among the eighth number of CORESETs by the MAC CE signaling is similar to the activation process in Manner 2 in this embodiment, which is not repeated here.

Further, the MAC CE signaling also carries a mapping relation between CORESET identifier combinations and codepoint values of the CORESET identifier combinations. Further, the UE receives the DCI signaling sent by the network device, where the DCI signaling carries a codepoint value. The CORESET identification combination includes at least one of the ninth number of CORESET identifiers.

It is understandable that the CORESET identification combination includes at least one CORESET identifier. Different numbers of CORESET identifiers can form different CORESET identifier combinations. In embodiments of the disclosure, a respective codepoint value is configured for each CORESET identifier combination, and a mapping relation between the CORESET identifier combinations and the codepoint values is established and sent to the UE through the MAC CE signaling.

In the disclosure, in order to distinguish the mapping relation between the CORESET identifier combinations and the codepoint values of the CORESET identifier combinations from other mapping relations in embodiments of the disclosure, the mapping relation between the CORESET identifier combinations and the codepoint values of the CORESET identifier combinations is referred to as the second mapping relation, which is not repeated below. In order to distinguish the codepoint carried in the DCI signaling from other codepoint values in embodiments of the disclosure, the codepoint value carried in the DCI signaling is referred to as the second code point value, which will not be repeated hereafter.

At block S402: one or more target TCI state identifiers are determined based on the second configuration information.

In some examples, in the case that the second configuration information is transmitted through the RRC signaling, the MAC CE signaling, or the DCI signaling separately, in embodiments of the disclosure, one or more TCI state identifiers corresponding to one or more CORESETs associated with the SS set carried in the RRC signaling, the MAC CE signaling or the DCI signaling are determined as the TCI state identifiers.

In some examples, in the case that the second configuration information is transmitted according to the Manner 1 in this embodiment, one or more target CORESET identifiers of one or more target CORESETs among the fifth number of CORESETs are activated by the MAC CE signaling, and one or more TCI state identifiers corresponding to the activated one or more target CORESET identifiers are determined as the target TCI state identifiers.

In some examples, in the case that the second configuration information is transmitted according to Manner 2 in this embodiment, one or more target CORESET identifiers of one or more target CORESET among the sixth number of CORESETs are indicated by the DCI signaling, and one or more TIC state identifiers corresponding to the indicated one or more target CORESET identifiers are determined as the target TCI state identifiers.

In some examples, in the case that the second configuration information is transmitted according to the Manner 3 in this embodiment, one or more TCI state identifiers corresponding to the target CORESET that is always associated with the SS set are determined as the target TCI state identifiers. For example, if there is an CORESET whose association relation with the SS set is activated or whose CORESET identifier is the indicated target CORESET identifier, the TCI state identifier corresponding to the CORE- SET whose associated relation is activated or the indicated target CORESET identifier is also determined as a target TCI state identifier.

In some examples, in the case that the second configuration information is transmitted according to the Manner 4 in this embodiment, the UE determines the target CORESET identifier combination according to the second codepoint value carried in the DCI signaling and the above-mentioned second mapping relation. For example, the UE queries the above-mentioned second mapping relation according to the second codepoint value carried in the DCI signaling, and can obtain the CORESET identifier combination corresponding to the second codepoint value. The CORESET identifier combination corresponding to the second codepoint value is determined as the target CORESET identification combination. Further, the one or more target TCI state identifiers are determined based on the target CORESET identifier combination.

For instance, a codepoint value having 3 bits may be 001, 010, 011 . . . . The CORESET identifier combination corresponding to 001 is the combination "$B_1$", the CORESET identifier combination corresponding to 010 is the combination "$B_2$", the CORESET identifier combination corresponding to 011 is the combination "$B_3$", and so on. The combination "B 1" includes the CORESET identifier "$C_1$", the combination "$B_2$" includes the CORESET identifier "$C_1$" and the CORESET identifier "$C_2$", and the combination "$B_3$" includes the CORESET identifier "$C_1$" and the CORESET identifier "$C_3$". If the second codepoint value carried in the DCI signaling is 011, the UE can determine the CORESET identifier combination "$B_3$" and then obtain the CORESET identifier "$C_1$" and the CORESET identifier "$C_3$" contained in the CORESET identifier combination "$B_3$". The CORESET identifier "$C_1$" and the CORESET identifier "$C_3$" are target CORESET identifiers. The UE determines TCI state identifiers corresponding to "$C_1$" and "$C_2$" as the target TCI state identifiers.

At block S403, one or more reference signals corresponding to the one or more target TCI state identifiers are determined and one or more beams corresponding to the one or more reference signals are used to receive the control signaling.

In embodiments of the disclosure, the block S403 may be implemented in any ways described in embodiments of the disclosure, which is not limited in embodiments and will not be repeated here.

It is understandable that, for any transmission manner of the second configuration information in embodiments of the disclosure, for one or more CORESETs associated with the SS set, each CORESET corresponds to a respective TCI state identifier, and the TCI state identifier is carried in the configuration information for the CORESET. For example, the configuration information for the CORESET may be sent by the network device to the UE before or after sending the second configuration information. Alternatively, the configuration information for the CORESET may be sent by the network device to the UE in synchronization with sending the second configuration information.

In response to the second configuration information indicating that the SS set is associated with one target CORESET, the UE determines the TCI state identifier corresponding to the target CORESET as the target TCI state identifier, and uses the beam corresponding to the target TCI state identifier to receive control signaling.

In response to the second configuration information indicating that the SS set is associated with multiple target CORESETs, the UE determines TCI state identifiers corresponding to all target CORESETs as the target TCI state identifiers, and uses beams corresponding to the target TCI state identifiers to receive the control signaling.

In embodiments of the disclosure, the second configuration information for the SS set sent by the network device is received, and the second configuration information is used as the indication information to indicate the UE to use either one target TCI state or multiple TCI states for receiving the control signaling carried on the PDCCH. The UE determines the one or more target TCI state identifiers based on the second configured information, determines one or more reference signals corresponding to the one or more target TCI state identifiers, and receives the control signaling carried on the PDCCH by adopting one or more beams corresponding to the one or more reference signals. In embodiments of the disclosure, when the network device flexibly switches between the multi-TRP-based transmission mode and the single-TRP-based transmission mode, the UE can receive the indication information from the network device and the UE can receive the control signaling by using either a single TCI state or multiple TCI states which is matched with the working mode adopted by the network device. In other words, one TCI state or more TCI states are used based on the working mode adopted by the network device, to receive the control signaling, which realizes the matching between the working mode adopted by the network device and the working mode adopted by the UE, ensures that the UE can correctly receive and decode the control signaling, and improves the decoding success rate of the control signaling.

Embodiments of the disclosure provide another transmission method. FIG. 5 is a schematic flowchart illustrating another transmission method according to embodiments of the disclosure. The method is performed by the UE. With the method, the UE can receive third configuration information for activing a link relation between association pairs in an association pair group sent by the network device. The third configuration information is used as the indication information. It is determined whether to use one target TCI state or multiple target TCI states to receive the control signaling carried on the PDCCH through the second configuration information.

At block S501, third configuration information for activating a link relation between association pairs in an association pair group sent by a network device is received. The third configuration information is the indication information.

In embodiments, each association pair includes a SS set and a CORESET associated with the SS set. The third configuration information is configured to activate the link relation between the association pairs included in the association pair group. For example, the SS set 1 and the CORESET 1 associated with the SS set 1 form an association pair 1, the SS set 2 and the CORESET 2 associated with the SS set 2 form an association pair 2, the association pair 1 and the association pair 2 can form an association pair group, where the association pair 1 and the association pair 2 have a link relation. This link relation may be activated through the third configuration information.

In embodiments of the disclosure, the third configuration information may be transmitted through at least one of the RRC signaling, the MAC CE signaling, or the DCI signaling.

As another possible implementation, the third configuration information may be transmitted through the RRC signaling, the MAC CE signaling, or the DCI signaling separately. In embodiments of the disclosure, the RRC signaling, MAC CE signaling or DCI signaling carries group identifier information of the association pair group whose link relation needs to be activated. The group identifier information corresponds to an identifier of the SS and a CORESET identifier of the CORESET associated with the SS set in each association pair included in the association pair group.

As another possible implementation, the third configuration information is transmitted through a combination of two or more of the RRC signaling, the MAC CE signaling, or the DCI signaling.

Manner 1, the third configuration information may be transmitted through the RRC signaling and/or the MAC CE signaling. The UE receives the RRC signaling and/or the MAC CE signaling sent by the network device, where the RRC signaling and/or the MAC CE signaling carry the group identifier information of one or more association pair groups. The group identifier information of each association pair group corresponds to the identifier of the SS set and the CORESET identifier of the CORESET associated with the SS set in each association pair included in the association pair group. For example, the RRC signaling carries the group identifier information of the one or more association pair groups. Further, the UE receives the MAC CE signaling sent by the network device, where the MAC CE signaling is configured to indicate the group identifier information of an association pair group whose link relation needs to be activated. Alternatively, the MAC CE signaling carries the group identifier information of the association pair group, and the MAC CE signaling is also configured to indicate the group identifier information of an association pair group whose link relation needs to be activated. Alternatively, both the RRC signaling and the MAC CE signaling carry the group identifier information of one or more association pair groups, and the MAC CE signaling is also configured to indicate the group identifier information of an association pair group whose link relation needs to be activated.

For instance, the association pair 1 and the association pair 2 form the association pair group 1. If the link relation between the association pair 1 and the association pair 2 needs to be activated, then the MAC CE signaling carries the group identifier information "1" of the association pair group 1 or the MAC CE signaling carries a bit position corresponding to the group identifier information of the association pair group 1. The UE may determine the identifier "$S_1$" of the SS set and the CORESET identifier "$C_1$" associated with the SS set in the association pair 1 and the identifier "$S_2$" of the SS set and the CORESET identifier "$C_2$" associated with the SS set in the association pair 2, based on the group identifier information "1".

In some examples, the RRC signaling can indicate two CORESET identifiers, or the RRC signaling can indicate bit positions of two CORESET identifiers and two identifiers of two SS sets in the MAC CE signaling. Alternatively, these bit positions are defaulted. The RRC may also indicate the group identifier information of one or more association pair groups or one or more bit positions corresponding to the group identifier information in the MAC CE signaling. For example, the association pair 1 corresponding to the SS set #0 and the CORESET #0 and the association pair 2 corresponding to the SS set #1 and CORESET #1 form an association pair group. The link relation between the association pair 1 and the association pair 2 corresponds to the lowest bit of the MAC CE signaling. For example, if the value of the lowest bit is "1", it indicates that the above-mentioned link relation corresponding to this bit is activated, otherwise, it means that the above-mentioned link relation corresponding to this bit is not activated, that is, the above-mentioned link relation corresponding to this bit is deactivated.

In some examples, the UE receives the RRC signaling sent by the network device, where the RRC signaling carries identifier information of one or more association pairs. The identifier information of each association pair corresponds to the identifier of the SS set and the CORESET identifier of the CORESET associated with the SS set in the association pair. Further, the UE receives the MAC CE signaling sent by the network device, where the MAC CE signaling is configured to activate one or more association pairs. In practice, one or more activated association pairs form a target association pair group. It is understandable that, if only one association pair is activated by the MAC CE signaling, it indicates that the UE receives the control signaling using a single TCI state, that is, the network device adopts the single-TRP-based transmission. Similarly, the MAC CE signaling carries the one or more bit positions corresponding to the identifier information of one or more association pairs. Depending on the value of the bit on the bit position, it is determined whether to activate the association pair corresponding to the bit position.

Manner 2, the third configuration information may be transmitted through a combination of one or both of the RRC signaling and/or the MAC CE signaling, as well as the DCI signaling. The UE receives the RRC signaling and/or the MAC CE signaling sent by the network device, where the RRC signaling and/or the MAC CE signaling carry the group identifier information of one or more association pair groups. The group identifier information corresponds to the identifier of the SS set and/or the CORESET identifier of the CORESET included in each association pair in the group. Further, the UE receives the DCI signaling sent by the network device, where the DCI signaling is configured to indicate identifier information of an association pair whose link relation needs to be activated.

In some examples, the RRC signaling may indicate two CORESET identifiers and two identifiers of two SS sets, or the RRC signaling may indicate bit positions of the two CORESETs and the two SS sets. Alternatively, these bit positions are defaulted. The RRC signaling also indicates the group identifier information of one or more association pair groups or bit positions corresponding to the group identifier information in the MAC CE signaling. For example, the association pair 1 corresponding to the SS set #0 and CORESET #0 and the association pair 2 corresponding to the SS set #1 and the CORESET #1 form an association pair group. The link relation between the association pair 1 and the association pair 2 corresponds to the lowest bit of the DCI signaling. For example, if the value of the lowest bit is "1", it indicates that the above-mentioned link relation corresponding to this bit is activated; otherwise, it means that the above-mentioned link relation corresponding to this bit is not activated, that is, the above-mentioned link relation corresponding to this bit is deactivated.

In some examples, the UE receives the RRC signaling sent by the network device, where the RRC signaling carries identifier information of one or more association pairs. The identifier information of each association pair corresponds to the identifier of the SS set and the CORESET identifier of the CORESET included in the association pair. Further, the UE receives the DCI signaling sent by the network device, where the DCI signaling is configured to indicate to activate one or more association pairs. In practice, the activated association pairs form a target association pair group. It is understandable that, if only one association pair is activated by the DCI signaling, it indicates that the UE receives the control signaling using a single TCI state, that is, the network device adopts the single-TRP-based transmission. Similarly, the DCI signaling carries one or more bit positions corresponding to the identifier information of one or more association pairs. Depending on the value of the bit on the bit position, it is determined whether to activate the association pair corresponding to the bit position.

At block S502, one or more target TCI state identifiers are determined based on the third configuration information.

In embodiments of the disclosure, the association pair group whose link relation is activated is the target association pair group, and the TCI state identifier corresponding to the CORESET in each association pair included in the target association pair group is determined as a target TCI state identifier.

In some examples, in the case that the third configuration information is transmitted through the RRC signaling, the MAC CE signaling, or the DCI signaling separately, in this embodiment, an association pair group whose link relation needs to be activated is obtained from the RRC signaling, the MAC CE signaling or the DCI signaling. The association pair group whose link relation needs to be activated is the target association pair group. The TCI state identifiers corresponding to the CORESET identifier of the CORESET in each association pair in the group identifier information of the target association pair group is determined as a target TCI state identifier.

In some examples, in the case that the third configuration information is transmitted according to the Manner 1 in this embodiment, the UE determines the association pair group whose link relation is activated based on the MAC CE signaling. The association pair group whose link relation is activated is the target association pair group. The TCI state identifier corresponding to the CORESET identifier of the CORESET in each association pair in the group identifier information of the target association pair group is determined as a target TCI state identifier.

For instance, if the link relation between THE association pair 1 and THE association pair 2 needs to be activated, then the association pair group formed by the association pair 1 and the association pair 2 is the target association pair group. The TCI state identifier corresponding to the identifier "$C_1$" of the CORESET in the association pair 1 and the TCI state identifier corresponding to the identifier "$C_2$" of the CORESET in the association pair 2 are determined as the target TCI state identifiers.

In some examples, in the case that the third configuration information is transmitted according to the Manner 2 in this embodiment, the UE determines the association pair group whose link relation needs to be activated based on the DCI signaling, and the association pair group whose link relation needs to be activated is the target association pair group. The TCI state identifier corresponding to the CORESET identifier of the CORESET in each association pair in the group identifier information of the target association pair group is determined as a target TCI state identifier.

It is understandable that the group identifier information mentioned in the above blocks S502 and S503 is configured to represent the association pair group. The correspondence between the identifier of the SS set and the CORESET identifier of the CORESET associated with the SS set included in each association pair group may be notified to the UE through at least one of the RRC signaling, the MAC CE or the DCI signaling.

At block S503: one or more reference signals corresponding to the one or more target TCI state identifiers are determined, and the control signaling is received by adopting one or more beams corresponding to the one or more reference signals.

In embodiments of the disclosure, the block S503 may be implemented in any ways described in embodiments of the disclosure, which is not limited in embodiments and will not be repeated here.

It is understandable that in the case that the link relation between two association pairs is activated, the UE can determine to adopt two respective TCI states of these two activated association pairs to receive the control signaling carried by the PDCCH on the resource of each SS set. In practice, the UE still uses two TCI states to receive control signaling. However, in the transmission scenario where the link relation is activated, the UE can determine that the PDCCHs sent on the two resources have an association, where this association means that the contents sent on the two resources are parts of the same control signaling respectively, or the contents sent on the resources are the entirety of the same control signaling respectively.

In the case the link relation between the two association pairs is not activated, the UE can determine to adopt two respective TCI states of these two association pairs to receive the control signaling carried on the PDCCH on the resource of each SS set. In practice, the UE still uses two TCI states to receive the control signaling. However, in a transmission scenario where the link relation is not activated, the UE can determine that the PDCCHs sent on the two resources does not have any association.

In embodiments of the disclosure, the third configuration information, sent by the network device, for activating the link relation between the association pairs in the association pair group is received, the third configuration information is used as the indication information. The UE determines the one or more target TCI state identifiers based on the third configuration information, determines one or more reference signals corresponding to the one or more target TCI state identifiers, and receives the control signaling carried on the PDCCH by adopting one or more beams corresponding to one or more reference signals. In embodiments of the disclosure, when the network device flexibly switches between the multi-TRP-based transmission mode and the single-TRP-based transmission mode, the UE can receive the indication information from the network device and the UE can receive the control signaling by using either a single TCI state or multiple TCI states which is matched with the working mode adopted by the network device. In other words, one TCI state or more TCI states are used based on the working mode adopted by the network device, to receive the control signaling, which realizes the matching between the working mode adopted by the network device and the working mode adopted by the UE, ensures that the UE can correctly receive and decode the control signaling, and improves the decoding success rate of the control signaling.

Figure 6:
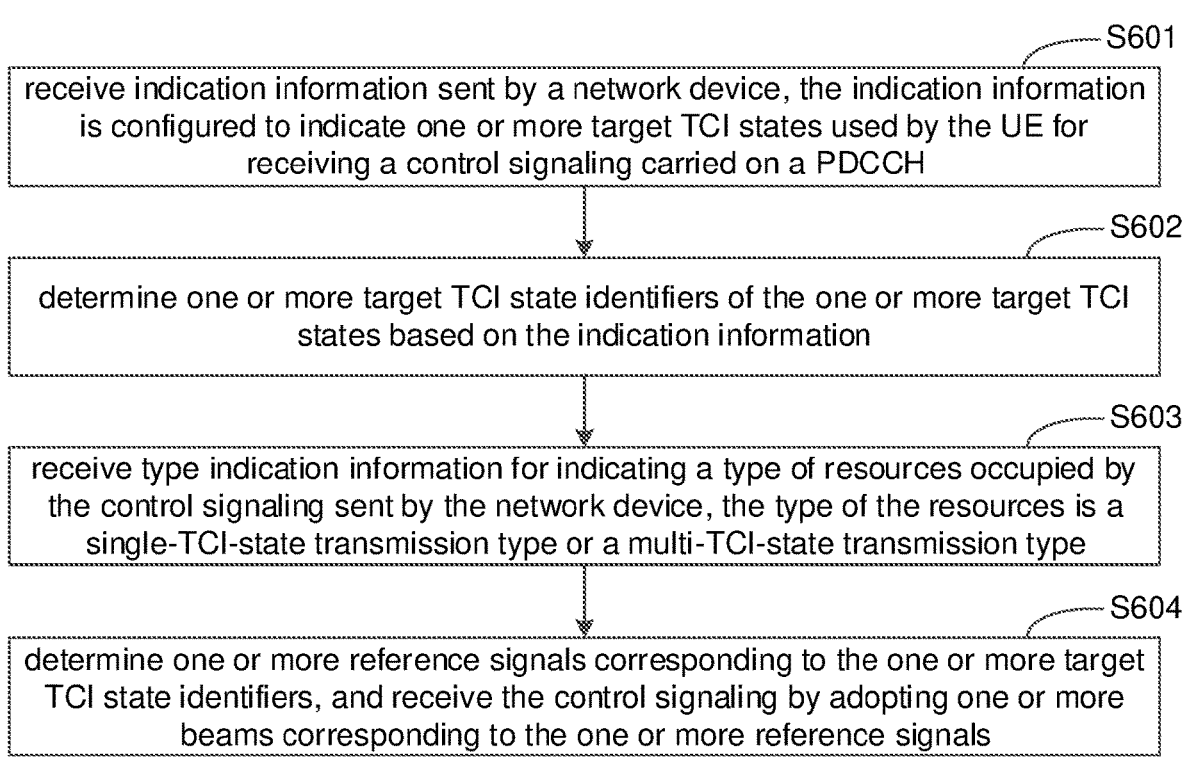
FIG. 6 is a schematic flowchart illustrating another transmission method according to some embodiments of the disclosure.

Embodiments of the disclosure provide another transmission method. FIG. 6 is a schematic flowchart illustrating another transmission method according to embodiments of the disclosure. The method is performed by the UE. The UE receives the indication information and type indication information for indicating a type of resources occupied by the control signaling, and determines, based on the indication information and the type indication information, whether to use one target TCI state or multiple target TCI states for receiving the control signaling transmitted on the occupied resource.

At block S601, indication information sent by a network device is received. The indication information is configured to indicate one or more target TCI states used by the UE for receiving the control signaling carried on the PDCCH.

The indication information may be configuration information for the CORESET and/or configuration information for the SS set. In embodiments of the disclosure, the indication information in the block S601 may be implemented in any ways described in embodiments of the disclosure, which is not limited in embodiments and will not be repeated here.

At block S602, one or more target TCI state identifiers are determined based on the indication information.

In embodiments of the disclosure, the block S602 may be implemented in any ways described in embodiments of the disclosure, which is not limited in embodiments and will not be repeated here.

At block S603, type indication information, sent by the network device, for indicating a type of resources occupied by the control signaling is received. The type of the resources occupied is a single-TCI-state transmission type or a multi-TCI-state transmission type.

Sending the control signaling carried on the PDCCH by the network device to the UE needs to occupy the resource. In embodiments of the disclosure, in a scenario where UE needs to use multiple target TCI states to receive control signaling, the network device may specify the type of each resource occupied by the control signaling, and send respective type indication information to the UE to indicate whether each resource occupied by the control signaling uses a single target TCI state for transmission or multiple target TCI states for transmission. In practice, the type of resources occupied is either a single-TCI-state transmission type or a multi-TCI-state transmission type. In embodiments of the disclosure, if the network device uses the single-TRP transmission to send the control signaling carried on the PDCCH to the UE, then the type of resources occupied by the control signaling is the single-TCI-state transmission type. If the network device uses the multi-TRP transmission to send the control signaling carried on the PDCCH to the UE, then the type of resources occupied by the control signaling is the multi-TCI-state transmission type.

As a possible implementation, the type indication information carries identifiers of the occupied resources using the single-TRP-transmission or identifiers of the occupied resources using the multi-TRP-transmission. In practice, the UE and the network device may negotiate in advance whether the type indication information indicates the identifiers of the occupied resources using the single-TRP-transmission or the identifiers of the occupied resources using the multi-TRP-transmission. After receiving the type indication information, the UE can determine the type of resources occupied by the control signaling to be received. In practice, the type indication information not only carries the identifiers of the occupied resources, but also uses an additional bit to represent the type of the occupied resources. For example, if the value of the additional bit is "1", it indicates that the type of the occupied resources carried in the type indication information is the single-TCI-state transmission type. If the value of the additional bit is "0", it indicates the type of the occupied resources carried in the type indication information is the multi-TCI-state transmission type. In this implementation, the type indication information is configured to only indicate either the resources of the single-TCI-state transmission type or the resources of the multi-TCI-state transmission type. The type for other resources that are not indicated is the single-TCI-state transmission type.

For example, when it is determined based on the configuration information for the CORESET that multiple target TCI states need to be used to receive the control signaling, the UE further receives the type indication information and determines based on the type indication information the type of partial frequency-domain resources of the CORESET occupied by the control signaling is the multi-TCI-state transmission type, and then the UE uses multiple TCI states to receive the control signaling transmitted through the partial frequency-domain resources and uses one target TCI state to receive the control signaling transmitted through the remaining frequency-domain resources. The partial frequency-domain resources of the CORESET can be represented by the number of resource blocks (RBs), by one or more PDCCH candidates, by one or more Control Channel Elements (CCEs) occupied by a PDCCH candidate, or by a Resource Element Group (REG) bundle occupied by a CCE.

For example, after it is determined, based on the SS set or the configuration information for the SS set and the CORESET, that the UE needs to use multiple target TCI states to receive control signaling, the UE further receives the type indication information and determines based on the type indication information that the type of partial resources of the SS set occupied by the control signaling is the multi-TCI-state transmission type, and then the UE uses the multiple TCI states to receive the control signaling transmitted through the partial resources and uses a single target TCI state to receive the control signaling transmitted through the remaining frequency-domain resources. The partial resources of the SS set can be partial frequency-domain resources, and this partial frequency-domain resources are partial frequency-domain resources of the CORESET associated with the SS set, which can be indicated by the number of RBs, by one or more PDCCH candidates, by one or more CCEs occupied by a PDCCH candidate, or by a REG bundle occupied by a CCE. The partial resources of the SS set can be partial time-domain resources, which can be some symbols corresponding to one CCE.

In embodiments of the disclosure, the resources occupied by the control signaling carried on the PDCCH may also be one of the following resources.

For example, the occupied resources may be the CORESET. That is, it is explicitly indicated which CORESET is used for multi-TRP transmission and which CORESET is used for single-TRP transmission, as described above.

For example, the occupied resources may be the SS set. That is, it is explicitly indicated which SS set is used for multi-TRP transmission and which SS set is used for single-TRP transmission, as described above.

After the network device determines whether the control signaling is sent by a single TRP or multiple TRPs, the network device can select the resource as needed. When the UE performs blind detection, if detecting its own PDCCH, the UE will know, based on the type indication information for indicating the type of the resources occupied by the control signaling, whether a single target TCI state or multiple target TCI states are used to receive the control signaling.

At block S604, one or more reference signals corresponding to the one or more target TCI state identifiers are determined, and one or more beams corresponding to the one or more reference signals are used to receive the control signaling.

In embodiments of the disclosure, after one or multiple TCI state identifiers corresponding to the resources occupied by the control signaling is determined based on the type indication information, corresponding reference signal(s) can be determined based on the target TCI state identifier(s), and beam(s) of the reference signal(s) can be used to receive the control signaling.

In embodiments of the disclosure, the block S604 may be implemented in any ways described in embodiments of the disclosure, which is not limited in embodiments and will not be repeated here.

In embodiments of the disclosure, the UE receives the indication information sent by the network device and the type indication information for indicating the type of resources occupied by the control signaling, and the UE determines, based on the indication information and the type indication information, whether to use one target TCI state or multiple target TCI states to receive the control signaling transmitted through the occupied resource. In embodiments of the disclosure, the type of resources occupied by the control signaling can be indicated, and depending on the type of the occupied resource, an appropriate receiving mode is used, which can ensure that the UE can correctly receive and decode the control signaling, and improve the success rate of decoding the control signaling.

Figure 7:
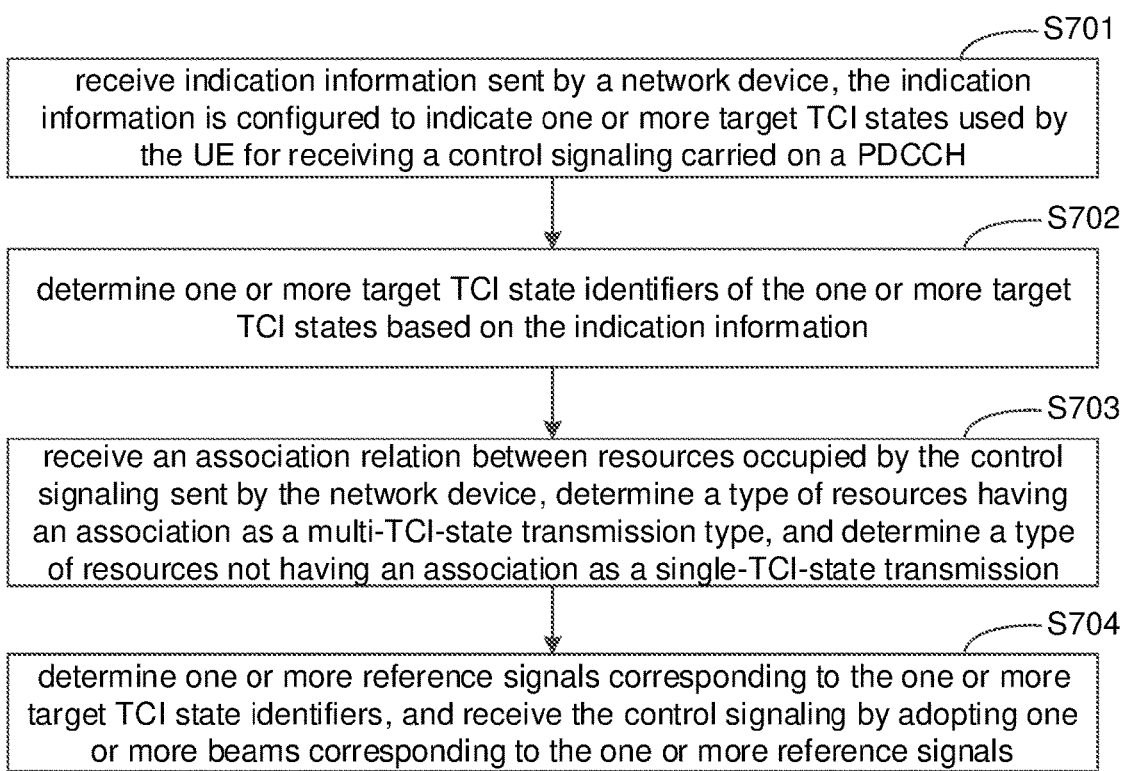
FIG. 7 is a schematic flowchart illustrating another transmission method according to some embodiments of the disclosure.

Embodiments of the disclosure provide another transmission method. FIG. 7 is a schematic flowchart illustrating another transmission method according to embodiments of the disclosure. The method is performed by the UE. The UE receives the indication information and an association relation between the resources occupied by the control signaling, and determines, based on the indication information and the association relation, whether to use one target TCI state or multiple target TCI states for receiving the control signaling transmitted through the occupied resources.

At block S701, indication information sent by a network device is received. The indication information is configured to indicate one or more target TCI states used by the UE for receiving the control signaling carried on the PDCCH.

The indication information may be the configuration information for the CORESET and/or the SS set. In embodiments of the disclosure, the indication information in the block S701 may be implemented in any ways described in embodiments of the disclosure, which is not limited in embodiments and will not be repeated here.

At block S702, one or more target TCI state identifiers are determined based on the indication information.

In embodiments of the disclosure, the block S702 may be implemented in any ways described in embodiments of the disclosure, which is not limited in embodiments and will not be repeated here.

At block S703, an association relation between resources occupied by the control signaling sent by the network device is received, the occupied resources having an association are determined as the multi-TCI-state transmission type, and the occupied resources that do not have an association are determined as the single-TCI-state transmission type.

Sending by the network device the control signaling carried on the PDCCH to the UE needs to occupy the resources. In embodiments of the disclosure, in a scenario where the UE receives the control signaling by adopting multiple target TCI state identifiers, the network device may specify a respective type of each resource occupied by the control signaling, and notify the UE of this. In embodiments of the disclosure, the type indication information may be the association relation between the occupied resources, where the association relation carries identifiers of resources that have the association. The UE can determine, based on the association relation, whether each resource occupied by the control signaling uses one target TCI state or multiple target TCI states for transmission. For example, the occupied resources having an association are determined as the multi-TCI-state transmission type, and the occupied resources without an association are determined as the single-TCI-state transmission type. In embodiments of the disclosure, when the network device uses the single-TRP transmission to send the control signaling carried on the PDCCH to the UE, the type of resources occupied by the control signaling is the single-TCI-state transmission type. When the network device uses the multi-TRP transmission to send the control signaling carried on the PDCCH to the UE, the type of resources occupied by the control signaling is the multi-TCI-state transmission type.

For example, when it is determined based on the configuration information for the CORESET that multiple target TCI states need to be used to receive the control signaling, the UE further receives the association relation between the resources occupied by the control signaling sent by the network device. The UE determines, based on identifiers of resources carried by the association relation, that the resources that can have an association are the multi-TCI-state transmission type, and the UE uses multiple TCI states to receive the control signaling transmitted on the resources that have the association.

In embodiments of the disclosure, the association granularity of the resources occupied by the control signaling carried on the PDCCH may be one of multiple resource dimensions.

For example, the association granularity of the occupied resources may be the CORESET. That is, it indicates which CORESETs have an association.

For example, the association granularity of the occupied resources may be the SS set. That is, it indicates which SS sets have an association.

For example, the association granularity of the occupied resources may be PDCCH candidate. That is, it indicates which PDCCH candidates have an association.

For example, the association granularity of the occupied resources may be different CCEs under the same PDCCH candidate. That is, it indicates which CCEs have an association.

For example, the association granularity of the occupied resources may be different REG bundles under the same CCE. That is, it indicates which REG bundles have an association.

For example, the association granularity of the occupied resources may be resources on different symbols under the same CCE. That is, it indicates which symbols have an association.

For example, the association granularity of the occupied resources may be different REGs under the same REG bundle. That is, it indicates which REGs have an association.

For example, the association granularity of the occupied resources may be different Resource Elements (REs) under the same REG. That is, it indicates which REs have an association.

For example, the association between the resources occupied by the control signaling may be notified to the UE through the RRC signaling or a combination of the RRC signaling and the MAC CE signaling.

After the network device determines to send the control signaling through a single TRP or multiple TRPs, the network device can select resources as needed. When the UE performs blind detection, if detecting its own PDCCH, the UE will know, based on the association relation of the resources occupied by the control signaling, whether to receive the control signaling by adopting one target TCI state or multiple target TCI states.

At block S704, one or more reference signals corresponding to the one or more target TCI state identifiers are determined, and one or more beams corresponding to one or more reference signals are used to receive the control signaling.

In embodiments of the disclosure, after the target TCI state identifier(s) corresponding to the resource(s) occupied by the control signaling is determined according to the association relation of the block S603, corresponding reference signal(s) can be determined based on the target TCI state identifier(s), and beam(s) corresponding to the reference signal(s) can be used to receive the control signaling.

In embodiments of the disclosure, the block S704 may be implemented in any ways described in embodiments of the disclosure, which is not limited in embodiments and will not be repeated here.

In embodiments of the disclosure, the UE receives the indication information and the association relation of the resources occupied by the control signaling sent by the network device and the UE determines, based on the indication information and the association relation, whether to use one target TCI state or multiple target TCI states to receive the control signaling transmitted on the occupied resources. In embodiments of the disclosure, the association relation of the resources occupied by the control signaling can be indicated, the type of the occupied resources is determined according to the association relation, and an appropriate receiving mode is used according to the type of the occupied resources to receive the control signaling, which can ensure that the UE can receive and decode correctly the control signaling and improve the success rate of decoding the control signaling.

FIG. 8 is a schematic flowchart illustrating another data transmission method according to embodiments of the disclosure. The method is performed by a network device which can perform the multi-TRP-based transmission or the single-TRP-based transmission on the PDCCH with the UE. The network device may be a base station. As illustrated in FIG. 8, the transmission method includes the following.

At block S801, a working mode used for sending the control signaling carried on the PDCCH is determined. The working mode is a single-TCI-state-based transmission or a multi-TCI-state-based transmission.

In embodiments of the disclosure, the network device may determine the working mode used for sending the control signaling carried on the PDCCH. The working mode may be either the single-TCI-state-based transmission or multi-TCI-state-based transmission. In embodiments, the single-TCI-state-based transmission means that the network device performs the transmission with the UE based on a single TRP. The multi-TCI-state-based transmission means that the network device performs the transmission with the UE based on multiple TRPs.

The network device can monitor a respective channel condition of each TRP and the resource state of the CORESET to determine the working mode. Taking two-TRP-transmission as an example, if the channel conditions of the two TRPs are both good, it can be determined to use two TRPs for transmission. If the channel condition of one TRP is poor, it can be determined to use the TRP with the better channel condition for transmission, i.e., using the single-TRP transmission. Similarly, if the CORESET resources of two TRP are sufficient, it can be determined to use two TRPs for transmission. If one of the TRPs has less CORESET resources, it can be determined to use the TRP with sufficient CORESET resources transmission, i.e., using the single-TRP transmission.

At block S802, indication information is sent to the UE. The indication information is configured to indicate one or more target TCI states used by the UE for receiving a control signaling carried on the PDCCH.

In embodiments of the disclosure, the indication information may be configuration information or other information transmitted on the PBCH and/or the PDCCH and/or the PDSCH. For example, the indication information may be configuration information for the CORESET and/or the SS set. The network device determines a respective target TCI state identifier of each target TCI based on the configuration information for the CORESET and/or the SS set. In some embodiments, the network device may send the indication information to the UE through the configuration signaling, a control signaling, other signaling, or a combination thereof transmitted through the PBCH and/or PDCCH and/or PDSCH. The specific form of the indication information is not limited in the disclosure.

The indication information is configured to indicate one or more TCI states used by the UE for receiving the control signaling carried on the PDCCH. In other words, the indication information can indicate whether one target TCI state or multiple target TCI states will be used by the UE for receiving the control signaling. In some embodiments of the disclosure, the control signaling carried on the PDCCH may be a DCI signaling or any other signaling. In embodiments of the disclosure, the specific form of the control signaling carried on the PDCCH is not limited.

In embodiments of the disclosure, the network device may determine the indication information according to the working mode used for sending the control signaling carried on the PDCCH. When the working mode adopted by the network device is the single-TRP-based transmission, the indication information is configured to indicate a single target TCI state used by the UE for receiving the control signaling carried on the PDCCH. When the working mode adopted by the network device is multi-TRP-based transmission, the indication information is configured to indicate multiple target TCI states used by the UE for receiving the control signaling carried on the PDCCH.

At block S803, control signaling is sent to the UE on the PDCCH.

In embodiments of the disclosure, the network device may send the control signaling to the UE on the PDCCH to provide the UE with a service. It is understandable that the network device can send the control signaling to the UE on the PDCCH according to the working mode adopted for sending the control signaling carried on the PDCCH. The working mode may be the single-TCI-state-based transmission or the multi-TCI-state-based transmission.

In embodiments of the disclosure, the network device may determine the working mode used for sending the control signaling carried on the PDCCH, where the working mode is single-TCI-state-based transmission or the multi-TCI-state-based transmission, send the indication information to the UE, and send the control signaling to the UE on the PDCCH. The indication information is configured to indicate whether one target TCI state or multiple target TCI states are used by the UE to the control signaling carried on the PDCCH. Therefore, the network device can send the indication information to the UE, so that the UE can obtain the indication of using one or more target TCI states to receive the control signaling carried on the PDCCH from the indication information. The UE can use one or multiple TCI states to receive control signaling based on the working mode adopted by the network device, thereby realizing the matching of working modes between the network device and the UE, ensuring that the UE can correctly receive and decode the control signaling, and improving the success rate of decoding the control signaling. While taking into account the rationality of resources, the efficiency of data transmission is improved.

FIG. 9 is a schematic flowchart illustrated another data transmission method according to embodiments of the disclosure. The method is performed by a network device. As illustrated in FIG. 9, the method includes the following.

At block S901, a working mode used for sending the control signaling carried on the PDCCH is determined. The working mode is a single-TCI-state-based transmission or a multi-TCI-state-based transmission.

In embodiments of the disclosure, the block S901 may be implemented in any ways described in embodiments of the disclosure, which is not limited in embodiments and will not be repeated here.

At block S902, first configuration information for the CORESET is sent to the UE. The first configuration information is the indication information. The first configuration information is configured to indicate one or more TCI state identifiers corresponding to the CORESET. One or more TCI states corresponding to the one or more TCI state identifiers are the one or more target TCI states.

In some embodiments of the disclosure, the indication information may be the first configuration information for the CORESET. The first configuration information is configured to indicate one or more TCI state identifiers corresponding to the CORESET. One or more TCI states corresponding to the one or more TCI state identifiers are the one or more target TCI states.

In some embodiments of the disclosure, sending the first configuration information for CORESET to the UE may include sending a RRC signaling, a MAC CE signaling or a DCI signaling to the UE. The RRC signaling, the MAC CE signaling or the DCI signaling carries the one or more TCI status identifiers corresponding to the CORESET.

It is understandable that the network device may send at least one of the RRC signaling, the MAC CE signaling, or the DCI signaling to the UE, so as to send the first configuration information to the UE.

The process that the network device sends the first configuration information to the UE may be implemented in any ways according to embodiments of the disclosure, which is not limited in the disclosure and will not be described again.

It is understandable that, in response to the first configuration information indicating that the CORESET corresponds to one TCI state identifier, the network device instructs the UE to use the beam corresponding to the one TCI state identifier corresponding to the CORESET to receive the control signaling carried on the PDCCH.

Alternatively, in response to the first configuration information indicating that the CORESET corresponds to multiple TCI state identifiers, the network device instructs the UE to use the beams corresponding to the multiple TCI state identifiers corresponding to the CORESET to receive the control signaling carried on the PDCCH.

At block S903, control signaling is sent to the UE on the PDCCH.

In embodiments of the disclosure, the block S903 may be implemented in any ways described in embodiments of the disclosure, which is not limited in embodiments and will not be repeated here.

In embodiments of the disclosure, the network device may determine the working mode used for sending the control signaling carried on the PDCCH, where the working mode is single-TCI-state-based transmission or the multi-TCI-state-based transmission, send the first configuration information for the CORESET to the UE, and send the control signaling to the UE on the PDCCH. Therefore, the network device can send the first configuration information to the UE, so that the UE can obtain the indication of using one or more target TCI states to receive the control signaling carried on the PDCCH from the first configuration information. The UE can use one or multiple TCI states to receive control signaling based on the working mode adopted by the network device, thereby realizing the matching of working modes between the network device and the UE, ensuring that the UE can correctly receive and decode the control signaling, and improving the success rate of decoding the control signaling. While taking into account the rationality of resources, the efficiency of data transmission is improved.

FIG. 10 is a schematic flowchart illustrating another data transmission method according to embodiments of the disclosure. The method is performed by the network device. As illustrated in FIG. 10, the method includes the following.

At block S1001, a working mode used for sending the control signaling carried on the PDCCH is received. The working mode is a single-TCI-state transmission or a multi-TCI-state-based transmission.

In embodiments of the disclosure, the block S1001 may be implemented in any ways described in embodiments of the disclosure, which is not limited in embodiments and will not be repeated here.

At block S1002, second configuration information for the SS set is sent to the UE. The second configuration information is the indication information. The second configuration information is configured to indicate one or more CORESETs associated with the SS set. One or more TCI states corresponding to one or more TCI state identifiers corresponding to the one or more CORESETs are the one or more target TCI states.

In some embodiments of the disclosure, the indication information may be the second configuration information for the SS set. The second configuration information is configured to indicate one or more CORESETs associated with the SS set. One or more TCI states corresponding to one or more TCI state identifiers corresponding to the one or more CORESETs are the one or more target TCI states.

In some embodiments of the disclosure, the second configuration information for the SS set is sent to the UE by sending the RRC signaling, the MAC CE signaling or the DCI signaling to the UE. The RRC signaling, the MAC CE signaling or the DCI signaling indicates the one or more target CORESETs associated with the SS set.

It is understandable that the network device may send at least one of the RRC signaling, the MAC CE signaling, or the DCI signaling to the UE, so as to send the second configuration information to the UE.

The process that the network device sends the second configuration information to the UE may be implemented in any ways according to embodiments of the disclosure, which is not limited in the disclosure and will not be described again.

At block S1003, the control signaling is sent to the UE on the PDCCH.

In embodiments of the disclosure, the block S1003 may be implemented in any ways described in embodiments of the disclosure, which is not limited in embodiments and will not be repeated here.

In embodiments of the disclosure, the network device may determine the working mode used for sending the control signaling carried on the PDCCH, where the working mode is single-TCI-state-based transmission or the multi-TCI-state-based transmission, send the second configuration information for the SS set to the UE, and send the control signaling to the UE on the PDCCH. Therefore, the network device can send the second configuration information to the UE, so that the UE can obtain the indication of using one or more target TCI states to receive the control signaling carried on the PDCCH from the second configuration information. The UE can use one or multiple TCI states to receive control signaling based on the working mode adopted by the network device, thereby realizing the matching of working modes between the network device and the UE, ensuring that the UE can correctly receive and decode the control signaling, and improving the success rate of decoding the control signaling. While taking into account the rationality of resources, the efficiency of data transmission is improved.

FIG. 11 is a schematic flowchart illustrating another data transmission method according to embodiments of the disclosure. The method is performed by the network device. As illustrated in FIG. 11, the method includes the following.

At block S1101, a working mode used for sending the control signaling carried on the PDCCH is received. The working mode is a single-TCI-state transmission or a multi-TCI-state-based transmission.

In embodiments of the disclosure, the block S1101 may be implemented in any ways described in embodiments of the disclosure, which is not limited in embodiments and will not be repeated here.

At block S1102, third configuration information for activating a link relation between association pairs in an association pair group is sent to the UE. Each association pair includes a SS set and a CORESET associated with the SS set, and the association pair group includes at least two association pairs. An association pair group whose link relation is activated is the target association pair group. One or more TCI states corresponding to one or more TCI state identifiers corresponding to one or more CORESETs included in the target association pair group are the one or more target TCI states.

In embodiments of the disclosure, the indication information may be the third configuration information for activating a link relation between association pairs in an association pair group. In embodiments, each association pair includes a SS set and a CORESET associated with the SS set. The third configuration information is configured to activate the link relation between the association pairs included in the association pair group.

In embodiments of the disclosure, sending the third configuration information for activating the link relation between the association pairs in the association pair group to the UE may include sending a RRC signaling, a MAC CE signaling or a DCI signaling to the UE. The RRC signaling, the MAC CE signaling or the DCI signaling carries group identifier information of the association pair group whose link relation is to be activated. The group identifier information corresponds to the identifier of the SS set and the CORESET identifier of the CORESET associated with the SS set in each association pair of the association pair group.

It is understandable that the network device may send at least one of the RRC signaling, the MAC CE signaling, or the DCI signaling to the UE, so as to send the third configuration information to the UE.

The process that the network device sends the third configuration information to the UE may be implemented in any ways according to embodiments of the disclosure, which is not limited in the disclosure and will not be described again.

At block S1103, the control signaling is sent to the UE on the PDCCH.

In embodiments of the disclosure, the block S1103 may be implemented in any ways described in embodiments of the disclosure, which is not limited in embodiments and will not be repeated here.

In embodiments of the disclosure, the network device may determine the working mode used for sending the control signaling carried on the PDCCH, where the working mode is single-TCI-state-based transmission or the multi-TCI-state-based transmission, send the third configuration information for the SS set to the UE, and send the control signaling to the UE on the PDCCH. Therefore, the network device can send the third configuration information to the UE, so that the UE can obtain the indication of using one or more target TCI states to receive the control signaling carried on the PDCCH from the third configuration information. The UE can use one or multiple TCI states to receive control signaling based on the working mode adopted by the network device, thereby realizing the matching of working modes between the network device and the UE, ensuring that the UE can correctly receive and decode the control signaling, and improving the success rate of decoding the control signaling. While taking into account the rationality of resources, the efficiency of data transmission is improved.

FIG. 12 is a schematic flowchart illustrating another data transmission method according to embodiments of the disclosure. The method is performed by the network device. As illustrated in FIG. 12, the method includes the following.

At block S1201, a working mode used for sending the control signaling carried on the PDCCH is received. The working mode is a single-TCI-state-based transmission or a multi-TCI-state-based transmission.

At block S1202, indication information is sent to the UE. The indication information is configured to indicate one or more target TCI states used by the UE for receiving the control signaling carried on the PDCCH.

In embodiments of the disclosure, the block S1201 and the block S1202 may be implemented in any ways described in embodiments of the disclosure, which is not limited in embodiments and will not be repeated here.

At block S1203, control signaling is sent to the UE on the PDCCH. Type indication information for indicating a type of resources occupied by the control signaling is sent to the UE. A type of the occupied resources is a single-TCI-state transmission type or a multi-TCI-state transmission type.

In embodiments of the disclosure, sending the control signaling to the UE on the PDCCH may be implemented in any ways according to embodiments of the disclosure, which is not limited in the disclosure and will not be repeated here.

Sending the control signaling carried on the PDCCH by the network device to the UE needs to occupy resources. In embodiments, in a scenario where the UE needs to use multiple target TCI states to receive the control signaling, the network device may specify the type of each resource occupied by the control signaling, and send respective type indication information to the UE to indicate whether each resource occupied by the control signaling uses a single target TCI state for transmission or multiple target TCI states for transmission. In practice, the type of resources occupied is either a single-TCI-state transmission type or a multi-TCI-state transmission type. In embodiments of the disclosure, if the network device uses the single-TRP transmission to send the control signaling carried on the PDCCH to the UE, then the type of resources occupied by the control signaling is the single-TCI-state transmission type. If the network device uses the multi-TRP transmission to send the control signaling carried on the PDCCH to the UE, then the type of resources occupied by the control signaling is the multi-TCI-state transmission type.

The type indication information may be implemented in any ways according to embodiments of the disclosure, which is not limited in the disclosure and will not be described again.

In embodiments of the disclosure, the resources occupied by the control signaling carried on the PDCCH may be one of various resource dimensions. For the introduction of the resource dimension, reference may be made to the description of the relevant content in the foregoing embodiment, which will not be repeated here. After the network device determines to send the control signaling through a single TRP or multiple TRPs, the network device can select resources as needed. Therefore, when the UE performs blind detection, if detecting its own PDCCH, according to the association relation of the resources occupied by the control signaling, the UE will know whether the control signaling is received by adopting one target TCI state or multiple target TCI states.

In embodiments of the disclosure, the network device may determine the working mode used for sending the control signaling carried on the PDCCH, where the working mode is the single-TCI-state transmission or the multi-TCI-state transmission, send the indication information to the UE, send the control signaling to the UE on the PDCCH, and send the type indication information for indicating the type of the resources occupied by the control signaling to the UE. The type of the occupied resources is a single-TCI-state transmission type or a multi-TCI-state transmission type. In this way, the network device can send the control signaling and the type indication information of the resources occupied by the control signaling to the UE, so that the UE determines, based on the indication information and the type indication information, whether to use a single TCI state or multiple TCI states to receive the control signaling transmitted on the occupied resources, thereby ensuring that the UE can correctly receive and decode the control signaling, improving the success rate of decoding the control signaling. The data transmission efficiency is improved while taking into account the rationality of resources.

FIG. 13 is a schematic flowchart illustrating another data transmission method according to embodiments of the disclosure. The method is performed by the network device. As illustrated in FIG. 13, the method includes the following.

At block S1301, a working mode used for sending the control signaling carried on the PDCCH is determined. The working mode is a single-TCI-state-based transmission or a multi-TCI-state-based transmission.

At block S1302, indication information is sent to the UE. The indication information is configured to indicate one or more target TCI states used by the UE for receiving the control signaling carried on the PDCCH.

In embodiments of the disclosure, the block S1301 and the block S1302 may be implemented in any ways described in embodiments of the disclosure, which is not limited in embodiments and will not be repeated here.

At block S1303, control signaling is sent to the UE on the PDCCH, and an association relation of the resources occupied by the control signaling is sent to the UE. A type of the occupied resources with an association is a multi-TCI-state transmission type, and a type of the occupied resources without an association is a single-TCI-state transmission type.

In embodiments of the disclosure, sending the control signaling to the UE on the PDCCH may be implemented in any ways according to embodiments of the disclosure, which is not limited in the disclosure and will not be repeated here.

Sending by the network device the control signaling carried on the PDCCH to the UE needs to occupy the resources. In embodiments of the disclosure, in a scenario where the UE receives the control signaling by adopting multiple target TCI state identifiers, the network device may specify a respective type of each resource occupied by the control signaling, and notify the UE of this. In embodiments of the disclosure, the type indication information may be the association relation between the occupied resources, where the association relation carries identifiers of resources that have the association. The UE can determine, based on the association relation, whether each resource occupied by the control signaling uses one target TCI state or multiple target TCI states for transmission. For example, the occupied resources having an association are determined as the multi-TCI-state transmission type, and the occupied resources without an association are determined as the single-TCI-state transmission type. In embodiments of the disclosure, when the network device uses the single-TRP transmission to send the control signaling carried on the PDCCH to the UE, the type of resources occupied by the control signaling is the single-TCI-state transmission type. When the network device uses the multi-TRP transmission to send the control signaling carried on the PDCCH to the UE, the type of resources occupied by the control signaling is the multi-TCI-state transmission type.

In embodiments of the disclosure, the resources occupied by the control signaling carried on the PDCCH may be one of various resource dimensions. For the introduction of the resource dimension, reference may be made to the description of the relevant content in the foregoing embodiment, which will not be repeated here.

After the network device determines to send the control signaling through a single TRP or multiple TRPs, the network device can select resources as needed. Therefore, when the UE performs blind detection, if detecting its own PDCCH, according to the association relation of the resources occupied by the control signaling, the UE will know whether the control signaling is received by adopting one target TCI state or multiple target TCI states.

In embodiments of the disclosure, the network device may determine the working mode used for sending the control signaling carried on the PDCCH, where the working mode is the single-TCI-state transmission or the multi-TCI-state transmission, send the indication information to the UE, send the control signaling to the UE on the PDCCH, and send the association relation between the resources occupied by the control signaling to the UE, where the type of the occupied resources with an association is the single-TCI-state transmission type and the type of the occupied resources without an association is the multi-TCI-state transmission type. In this way, the network device can send the control signaling and the association relation between the resources occupied by the control signaling to the UE, so that the UE determines, based on the indication information and the association relation, whether to use a single TCI state or multiple TCI states to receive the control signaling transmitted on the occupied resources, thereby ensuring that the UE can correctly receive and decode the control signaling, improving the success rate of decoding the control signaling. The data transmission efficiency is improved while taking into account the rationality of resources.

Figure 14:
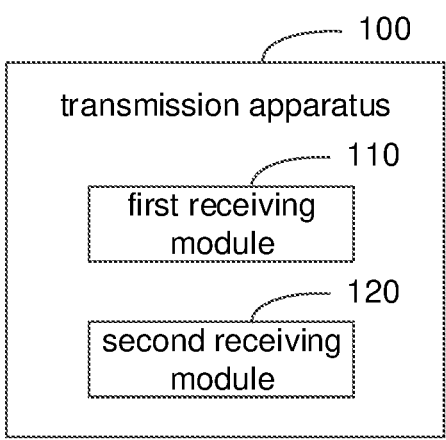
FIG. 14 is a block diagram illustrating a transmission apparatus according to some embodiments of the disclosure.

Corresponding to the transmission method according to the above-mentioned embodiments, the disclosure further provides a transmission apparatus. Since the transmission apparatus according to embodiments of the disclosure corresponds to the transmission method as illustrated in FIGS. 1 to 7, the implementation manners of the transmission method are all applicable to the transmission apparatus, which will not be described in detail here. FIG. 14 is a block diagram illustrating a transmission apparatus according to embodiments of the disclosure.

FIG. 14 is a block diagram illustrating a transmission apparatus according to embodiments of the disclosure.

As illustrated in FIG. 14, the transmission apparatus 100 includes a first receiving module 110 and a second receiving module 120.

The first receiving module 110 is configured to receive indication information sent by a network device. The indication information is configured to indicate one or more target TCI states used by the UE to receive the control signaling carried on the PDCCH.

The second receiving module 120 is configured to receive the control signaling based on the indication information.

Figure 15:
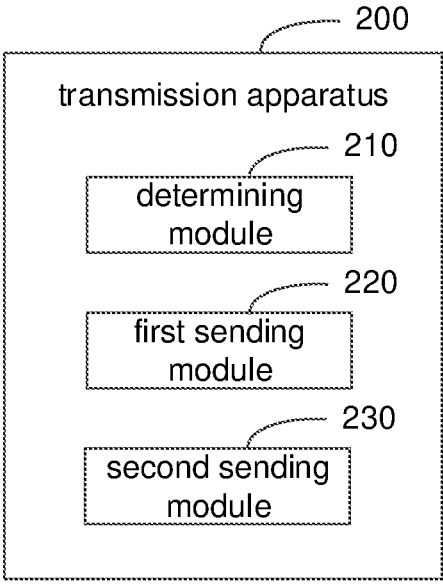
FIG. 15 is a block diagram illustrating another transmission apparatus according to some embodiments of the disclosure.

Corresponding to the transmission method according to the above-mentioned embodiments, the disclosure further provides a transmission apparatus. Since the transmission apparatus according to embodiments of the disclosure corresponds to the transmission method as illustrated in FIGS. 8 to 13, the implementation manners of the transmission method are all applicable to the transmission apparatus, which will not be described in detail here. FIG. 15 is a block diagram illustrating a transmission apparatus according to embodiments of the disclosure.

FIG. 15 is a block diagram illustrating a transmission apparatus according to embodiments of the disclosure.

As illustrated in FIG. 15, the transmission apparatus 200 includes: a determining module 210, a first sending module 220, and a second sending module 230.

The determining module 210 is configured to determine a working mode adopted for sending a control signaling carried on the PDCCH. The working mode is a single-TCI-state-based transmission or a multi-TCI-state-based transmission.

The first sending module 220 is configured to send indication information to the UE. The indication information is configured to indicate one or more target TCI states used by the UE for receiving the control signaling carried on the PDCCH.

The second sending module 230 is configured to send the control signaling to the UE on the PDCCH.

With the transmission apparatuses according to embodiments of the disclosure, the network device may determine the working mode used for sending the control signaling carried on the PDCCH, where the working mode is single-TCI-state-based transmission or the multi-TCI-state-based transmission, send the indication information to the UE, and send the control signaling to the UE on the PDCCH. The indication information is configured to indicate whether one target TCI state or multiple target TCI states are used by the UE to the control signaling carried on the PDCCH. Therefore, the network device can send the indication information to the UE, so that the UE can obtain the indication of using one or more target TCI states to receive the control signaling carried on the PDCCH from the indication information. The UE can use one or multiple TCI states to receive control signaling based on the working mode adopted by the network device, thereby realizing the matching of working modes between the network device and the UE, ensuring that the UE can correctly receive and decode the control signaling, and improving the success rate of decoding the control signaling. While taking into account the rationality of resources, the efficiency of data transmission is improved.

According to embodiments of the disclosure, there is further provided a communication device and a readable storage medium.

Figure 16:
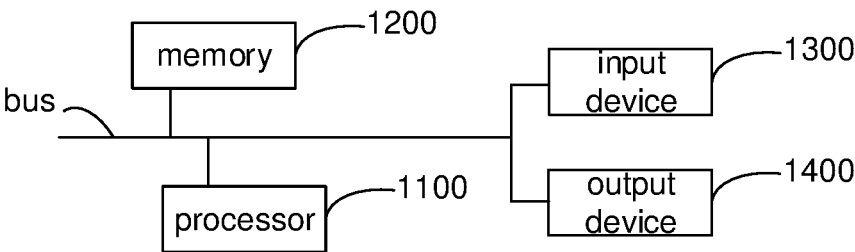
FIG. 16 is a block diagram illustrating a communication device according to some embodiments of the disclosure.

FIG. 16 is a block diagram illustrating a communication device according to embodiments of the disclosure. The communication device is intended to represent various forms of digital computers, such as the laptop computer, the desktop computer, the workstation, the personal digital assistant, the server, the blade server, the mainframe computer, and other suitable computers. The communication device may also represent various forms of mobile devices, such as the personal digital processor, the cellular phone, the smart phone, the wearable device, and other similar computing devices. Components shown herein, their connections and relations, and their functions are by way of example only, and are not intended to limit implementations of the disclosure described and/or claimed herein.

As illustrated in FIG. 16, the communication device includes: one or more processors 1100, a memory 1200, and interfaces for connecting various components, including high-speed interfaces and low-speed interfaces. The various components are interconnected using different buses and may be mounted on a common motherboard or otherwise as desired. The processor may process instructions executed within the communication device, including instructions stored in or on memory for displaying graphical information of the GUI on an external input/output device, such as a display device coupled to the interfaces. In some embodiments, multiple processors and/or multiple buses may be used with multiple memories, if desired. Likewise, multiple communication devices may be connected, and each device provides some of the necessary operations (e.g., as a server array, a group of blade servers, or a multi-processor system). One processor 1100 is taken as an example in FIG. 16.

The memory 1200 is a non-transitory computer-readable storage medium according to the disclosure. The memory stores instructions executable by at least one processor to cause the at least one processor to perform the transmission methods according to the disclosure. The non-transitory computer-readable storage medium in the disclosure has computer instructions stored thereon. The computer instructions are configured to cause a computer to perform the transmission methods according to the disclosure.

As the non-transitory computer-readable storage medium, the memory 1200 can be used to store a non-transitory software program, a non-transitory computer-executable program and module, such as program instructions/modules corresponding to the transmission methods according to embodiments of the disclosure (such as the first receiving module 110 and the second receiving module 120 as illustrated in FIG. 16). The processor 1100 executes various functional applications and data processing of the server, i.e., implements the above-mentioned transmission methods, by running the non-transitory software programs, instructions and modules stored in the memory 1200.

The memory 1200 may include a storage program area and a storage data area. The storage program area may store an operating system, an application program required for at least one function. The storage data area may store data created according to the use of the positioning communication device and the like. Additionally, the memory 1200 may include high-speed random access memory, non-transitory memory, such as at least one magnetic disk storage device, flash memory device, or other non-transitory solid-state storage device. The memory 1200 may include memory located remotely from the processor 1100. These remote memories may be connected to the positioning communication device through a network. Examples of such networks include, but are not limited to, the Internet, an intranet, a local area network, a mobile communication network, and combinations thereof.

The communication device may further include: an input device 1300 and an output device 1400. The processor 1100, the memory 1200, the input device 1300, and the output device 1400 may be connected through a bus or in other ways, and the connection through a bus is taken as an example in FIG. 16.

The input device 1300 may receive inputted numerical or character information and generate key signal input related to user settings and functional control of the positioning communication device. For example, the input device 1300 can be a touch screen, a keypad, a mouse, a trackpad, a touchpad, a pointing stick, one or more mouse buttons, a trackball, a joystick, etc. The output device 1400 may be a display device, an auxiliary lighting device (e.g., a LED), a tactile feedback device (e.g. a vibration motor), or the like. The display device may include, but is not limited to, a liquid crystal display (LCD), a light emitting diode (LED) display, and a plasma display. In some implementations, the display device may be a touch screen.

Various implementations of the systems and techniques described herein can be implemented in digital electronic circuitry, integrated circuit systems, application-specific application specific integrated circuits (ASICs), computer hardware, firmware, software, and/or combinations thereof. These various embodiments may be implemented in one or more computer programs executable and/or interpretable on a programmable system including at least one programmable processor. The programmable processor can be a special purpose or general-purpose programmable processor, may receive data and instructions from a storage system, at least one input device, and at least one output device, and transmit data and instructions to the storage system, the at least one input device, and the at least one output device.

These computational programs (also referred to as programs, software, software applications, or codes) include machine instructions for programmable processors, and may be implemented using high-level procedural and/or object-oriented programming languages, and/or assembly/machine languages calculation program. As used herein, the terms "machine-readable medium" and "computer-readable medium" refer to any computer program product, apparatus, and/or device for providing machine instructions and/or data to a programmable processor (e.g., magnetic disks, optical disks, memories, programmable logic devices (PLDs)), including machine-readable media that receive machine instructions as machine-readable signals. The term "machine-readable signal" refers to any signal used to provide machine instructions and/or data to a programmable processor.

To provide interaction with a user, the systems and techniques described herein may be implemented on a computer having a display device (e.g., a cathode ray tube (CRT) or LCD monitor) for displaying information to the user, and a keyboard and pointing device (e.g., a mouse or trackball) through which a user can provide input to the computer. Other kinds of devices can also be used to provide interaction with the user. For example, the feedback provided to the user can be any form of sensory feedback (e.g., visual feedback, auditory feedback, or tactile feedback). The input from the user can be received in any form including acoustic input, voice input, or tactile input.

The systems and techniques described herein may be implemented on a computing system that includes back-end components (e.g., as a data server), a computing system that includes middleware components (e.g., an application server), a computing system that includes front-end components (e.g., a user computer having a graphical user interface or web browser through which a user may interact with implementations of the systems and techniques described herein), or a computing system including combinations of the backend components, the middleware components or the front-end components. The components of the system may be interconnected by any form or medium of digital data communication (e.g., a communication network). Examples of communication networks include: Local Area Networks (LANs), Wide Area Networks (WANs), and the Internet.

The computer system can include the client and the server. The client and the server are generally remote from each other and usually interact through a communication network. The relation of the client and the server arises by computer programs running on the respective computers and having a client-server relation to each other.

With the transmission methods according to embodiments of the disclosure, the indication information sent by the network device is received, where the indication information is configured to indicate one or more target TCI states used by the UE for receiving the control signaling carried on the PDCCH. The control signaling carried on the PDCCH is received based on the indication information. In embodiments of the disclosure, when the network device flexibly switches between the multi-TRP-based transmission mode and the single-TRP-based transmission mode, the UE can receive the indication information from the network device and the UE can receive the control signaling by using either a single TCI state or multiple TCI states which is matched with the working mode adopted by the network device. In other words, one TCI state or more TCI states are used based on the working mode adopted by the network device, to receive the control signaling, which realizes the matching between the working mode adopted by the network device and the working mode adopted by the UE, ensures that the UE can correctly receive and decode the control signaling, and improves the decoding success rate of the control signaling.

It is understandable that the blocks may be reordered, added or deleted using the various forms of flowchart shown above. For example, the blocks described in the disclosure can be performed in parallel, sequentially or in different orders, and as long as the desired results of the technical solutions disclosed in the disclosure can be achieved, no limitation is imposed herein.

What is claimed is:

1. A transmission method, performed by user equipment (UE), the method comprising:
  receiving indication information sent by a network device, wherein the indication information is configured to indicate one or more target Transmission Configuration Indication (TCI) states used by the UE for receiving a control signaling carried on a Physical Downlink Control Channel (PDCCH); and
  receiving the control signaling based on the indication information;

wherein receiving the indication information sent by the network device comprises at least one of:
    receiving second configuration information, sent by the network device, for a Search Space Set (SS Set), wherein the second configuration information is the indication information, the second configuration information is configured to indicate one or more target Control Resource Sets (CORESETs) associated with the SS Set, and one or more TCI state identifiers corresponding to the one or more target CORESETs are one or more target TCI state identifiers; or
    receiving third configuration information, sent by the network device, for activating a link relation between association pairs in an association pair group, wherein the third configuration information is the indication information, each association pair comprises one Search Space Set (SS Set) and a Control Resource Set (CORESET) associated with the SS Set, the association pair group comprises at least two association pairs, an association pair group whose link relation is activated is a target association pair group, and one or more TCI state identifiers corresponding to one or more CORESETs contained in the association pair group are the one or more target TCI state identifiers.

2. The method of claim 1, wherein receiving the control signaling based on the indication information comprises:
  determining the one or more target TCI state identifiers of the one or more target TCI states based on the indication information; and
  determining one or more reference signals corresponding to the one or more target TCI state identifiers, and receiving the control signaling by adopting one or more beams corresponding to the one or more reference signals.

3. The method of claim 2, wherein receiving the indication information sent by the network device further comprises:
  receiving first configuration information, sent by the network device, for a Control Resource Set (CORESET), wherein the first configuration information is the indication information, the first configuration information is configured to indicate one or more TCI state identifiers corresponding to the CORESET, and the one or more TCI state identifiers corresponding to the CORESET are the one or more target TCI state identifiers.

4. The method of claim 3, wherein receiving the first configuration information, sent by the network device, for the CORESET comprises at least one of:
  receiving a Radio Resource Control (RRC) signaling, a Medium Access Control Address Control Element (MAC CE) signaling, or a Downlink Control Information (DCI) signaling sent by the network device, wherein the RRC signaling, the MAC CE signaling or the DCI signaling carries the one or more TCI state identifiers corresponding to the CORESET;
  receiving a Radio Resource Control (RRC) signaling sent by the network device, wherein the RRC signaling is configured to indicate a first number of TCI state identifiers corresponding to the CORESET, in which the first number is an integer greater than 1; and receiving a Medium Access Control Address Control Element (MAC CE) signaling sent by the network device, wherein the MAC CE signaling is configured to active one or more TCI state identifiers among the first number of TCI state identifiers, and the one or more activated TCI state identifiers are the one or more target TCI state identifiers;

receiving a Radio Resource Control (RRC) signaling sent by the network device, wherein the RRC signaling is configured to indicate a second number of TCI state identifiers corresponding to the CORESET, in which the second number is an integer greater than 1; and receiving a Downlink Control Information (DCI) signaling sent by the network device, wherein the DCI signaling is configured to indicate one or more TCI state identifiers among the second number of TCI state identifiers, and the indicated one or more TCI state identifiers are the one or more target TCI state identifiers; or receiving a Radio Resource Control (RRC) signaling sent by the network device, wherein the RRC signaling is configured to indicate a third number of TCI state identifiers corresponding to the CORESET, in which the third number is an integer greater than 1; receiving a Medium Access Control Address Control Element (MAC CE) signaling sent by the network device, wherein the MAC CE signaling carries an activation indication for state identifiers, in which the activation indication for state identifiers is configured to active a fourth number of TCI state identifiers among the third number of TCI state identifiers, the fourth number is an integer greater than 1, wherein the MAC CE signaling further carries a mapping relation between TCI state identifier combinations and codepoint values of the TCI state identifier combinations, in which each TCI state identifier combination comprises at least one TCI state identifier among the fourth number of TCI state identifiers; and receiving a Downlink Configuration Information (DCI) signaling sent by the network device, wherein the DCI signaling carries a codepoint value.

5. The method of claim 4, wherein determining the one or more target TCI state identifiers based on the indication information comprises:

determining a target TCI state identifier combination based on the mapping relation and the codepoint value, and determining the one or more target TCI state identifiers based on the target TCI state identifier combination.

6. The method of claim 1, wherein receiving the second configuration information, sent by the network device, for the SS Set comprises at least one of:

receiving a Radio Resource Control (RRC) signaling, a Medium Access Control Address Control Element (MAC CE) signaling, or a Downlink Control Information (DCI) signaling sent by the network device, wherein the RRC signaling, the MAC CE signaling or the DCI signaling is configured to indicate the one or more target CORESETs associated with the SS Set;

receiving a Radio Resource Control (RRC) signaling sent by the network device, wherein the RRC signaling is configured to indicate a fifth number of CORESETs associated with the SS Set; and receiving a Medium Access Control Address Control Element (MAC CE) signaling sent by the network device, wherein the MAC CE signaling is configured to active one or more target CORESET identifiers of the one or more target CORE-SETs among the fifth number of CORESETs;

receiving a Radio Resource Control (RRC) signaling sent by the network device, wherein the RRC signaling is configured to indicate a sixth number of CORESETs associated with the SS Set; and receiving a Downlink Control Information (DCI) signaling sent by the network device, wherein the DCI signaling is configured to indicate one or more target CORESET identifiers of the one or more target CORESETs among the sixth number of CORESETs; or receiving a Radio Resource Control (RRC) signaling sent by the network device, wherein the RRC signaling is configured to indicate one target CORESET associated with the SS Set and indicate one or more other possible CORESETs associated with the SS Set; and receiving a Medium Access Control Address Control Element (MAC CE) signaling and/or Downlink Control Information (DCI) signaling sent by the network device, wherein the MAC CE signaling and/or the DCI signaling is configured to carry activation information for association relations between the SS SET and the one or more other possible CORESETs, and the possible CORESET whose association relation is activated is the target CORESET.

7. The method of claim 1, further comprising:

receiving the control signaling by adopting a beam corresponding to one TCI state identifier in response to the first configuration information indicating that the CORESET corresponds to one TCI state identifier or in response to the second configuration information indicating that one target CORESET is associated with the SS Set; or receiving the control signaling by adopting beams corresponding to two or more TCI state identifiers in response to the first configuration information indicating that the CORESET corresponds to the two or more TCI state identifiers or in response to the second configuration information indicating that the two or more target CORESETs are associated with the SS Set;

wherein the TCI state identifier is carried in configuration information for the CORESET, and each CORESET corresponds to a respective TCI state identifier.

8. The method of claim 1, wherein receiving the third configuration information sent by the network device comprises at least one of:

receiving a Radio Resource Control (RRC) signaling, a Medium Access Control Address Control Element (MAC CE) signaling, or a Downlink Control Information (DCI) signaling sent by the network device, wherein the RRC signaling, the MAC CE signaling or the DCI signaling carries group identifier information of an association pair group whose link relation need to be activated, the group identifier information corresponds to an identifier of the SS Set and a CORESET identifier of the CORESET associated with the SS Set in each association pair of the association pair group;

receiving a Radio Resource Control (RRC) signaling and/or a Medium Access Control Address Control Element (MAC CE) signaling sent by the network device, wherein the RRC signaling and/or the MAC CE signaling carries group identifier information of one or more association pair groups, the group identifier information corresponds to an identifier of the SS Set and a CORESET identifier of the CORESET associated with the SS Set in each association pair of the one or more association pair groups, wherein the MAC CE signaling is configured to indicate to the group identifier information of an association pair group whose link relation is activated; or receiving a Radio Resource Control (RRC) signaling and/or a Medium Access Control Address Control Element (MAC CE) signaling sent by the network device, wherein the RRC signaling and/or MAC CE signaling carries group identification information of one or more association pair groups, the group identification information corresponds to an identifier of the SS Set and a CORESET identifier of the CORESET associated with the SS Set in each association pair of the one or more association pair groups; and receiving a Downlink Control Information (DCI) signaling sent by the network device, wherein the DCI signaling is configured to indicate group identifier information of an association pair group whose link relation is activated.

9. The method of claim 1, further comprising at least one of:

receiving type indication information for indicating a type of resources occupied by the control signaling sent by the network device, wherein the type of the resources is a single-TCI-state transmission type or a multi-TCI-state transmission type; or receiving an association relation between resources occupied by the control signaling sent by the network device, wherein a type of resources having an association is a multi-TCI-state transmission type, and a type of resources not having an association is a single-TCI-state transmission type.

10. The method of claim 9, wherein a granularity of the resources comprises at least one of:

Control Resource Set (CORESET);

Search Space Set (SS Set);

partial frequency resources of the CORESET;

PDCCH candidate;

Control Channel Element (CCE); or

Resource Element Group (REG) bundle.

11. A transmission method, performed by a network device, the method comprising:

determining a working mode for sending a control signaling carried on a Physical Downlink Control Channel (PDCCH); wherein the working mode is a single-Transmission Configuration Indication (TCI)-state-based transmission or a multi-TCI-state-based transmission;

sending indication information to user equipment (UE), wherein the indication information is configured to indicate one or more target TCI states used by the UE for receiving the control signaling carried on the PDCCH; and sending the control signaling on the PDCCH to the UE;

wherein sending the indication information to the UE comprises:

sending second configuration information for a Search Space Set (SS Set) to the UE, wherein the second configuration information is the indication information, the second configuration information is configured to indicate one or more target Control Resource Sets (CORESETs) associated with the SS Set, and one or more TCI state identifiers corresponding to the one or more target CORESETs are one or more target TCI state identifiers; or sending third configuration information for activating a link relation between association pairs in an association pair group to the UE, wherein the third configuration information is the indication information, each association pair comprises one Search Space Set (SS Set) and a Control Resource Set (CORESET) associated with the SS Set, the association pair group comprises at least two association pairs, an association pair group whose link relation is activated is a target association pair group, and one or more TCI state identifiers corresponding to one or more CORESETs contained in the association pair group are the one or more target TCI state identifiers.

12. The method of claim 11, wherein sending the indication information to the UE further comprises:

sending first configuration information for a Control Resource Set (CORESET) to the UE, wherein the first configuration information is the indication information, the first configuration information is configured to indicate one or more TCI state identifiers corresponding to the CORESET, and the one or more TCI state identifiers corresponding to the CORESET are the one or more target TCI state identifiers.

13. The method of claim 12, wherein sending the first configuration information for the CORESET to the UE comprises at least one of:

sending a Radio Resource Control (RRC) signaling, a Medium Access Control Address Control Element (MAC CE) signaling, or a Downlink Control Information (DCI) signaling to the UE, wherein the RRC signaling, the MAC CE signaling or the DCI signaling carries the one or more TCI state identifiers corresponding to the CORESET;

sending a Radio Resource Control (RRC) signaling to the UE, wherein the RRC signaling is configured to indicate a first number of TCI state identifiers corresponding to the CORESET, in which the first number is an integer greater than 1; and sending a Medium Access Control Address Control Element (MAC CE) signaling to the UE, wherein the MAC CE signaling is configured to active one or more TCI state identifiers among the first number of TCI state identifiers, and the one or more activated TCI state identifiers are the one or more target TCI state identifiers;

sending a Radio Resource Control (RRC) signaling to the UE, wherein the RRC signaling is configured to indicate a second number of TCI state identifiers corresponding to the CORESET, in which the second number is an integer greater than 1; and sending a Downlink Control Information (DCI) signaling to the UE, wherein the DCI signaling is configured to indicate one or more TCI state identifiers among the second number of TCI state identifiers, and the indicated one or more TCI state identifiers are the one or more target TCI state identifiers; or sending a Radio Resource Control (RRC) signaling to the UE, wherein the RRC signaling is configured to indicate a third number of TCI state identifiers corresponding to the CORESET, in which the third number is an integer greater than 1; sending a Medium Access Control Address Control Element (MAC CE) signaling to the UE, wherein the MAC CE signaling carries an activation indication for state identifiers, in which the activation indication for state identifiers is configured to active a fourth number of TCI state identifiers among the third number of TCI state identifiers, the fourth number is an integer greater than 1, wherein the MAC CE signaling further carries a mapping relation between TCI state identifier combinations and codepoint values of the TCI state identifier combinations, in which each TCI state identifier combination comprises at least one TCI state identifier among the fourth number of TCI state identifiers; and sending Downlink Control Information (DCI) signaling to the UE, wherein the DCI signaling carries a codepoint value; wherein the codepoint value and the mapping relation are used to determine a target TCI state identifier combination, and one or more TCI state identifiers contained in the target TCI state identifier combination are the one or more target TCI state identifiers.

14. The method of claim 11, wherein sending the second configuration information for the SS set to the UE comprises at least one of:

sending a Radio Resource Control (RRC) signaling, a Medium Access Control Address Control Element (MAC CE) signaling, or a Downlink Control Information (DCI) signaling to the UE, wherein the RRC signaling, the MAC CE signaling or the DCI signaling is configured to indicate the one or more target CORESETs associated with the SS Set;

sending a Radio Resource Control (RRC) signaling to the UE wherein the RRC signaling is configured to indicate a fifth number of CORESETs associated with the SS Set; and sending a Medium Access Control Address Control Element (MAC CE) signaling to the UE, wherein the MAC CE signaling is configured to active one or more target CORESET identifiers of the one or more target CORESETs among the fifth number of CORESETs;

sending a Radio Resource Control (RRC) signaling to the UE, wherein the RRC signaling is configured to indicate a sixth number of CORESETs associated with the SS Set; and sending a Downlink Control Information (DCI) signaling to the UE, wherein the DCI signaling is configured to indicate one or more target CORESET identifiers of the one or more target CORESETs among the sixth number of CORESETs; or sending a Radio Resource Control (RRC) signaling to the UE, wherein the RRC signaling is configured to indicate one target CORESET associated with the SS Set and indicate one or more other possible CORESETs associated with the SS Set; and sending a Medium Access Control Address Control Element (MAC CE) signaling and/or Downlink Control Information (DCI) signaling to the UE, wherein the MAC CE signaling and/or the DCI signaling is configured to carry activation information for association relations between the SS SET and the one or more other possible CORESETs, and the possible CORESET whose association relation is activated is the target CORESET.

15. The method of claim 12, further comprising:

indicating the UE to receive the control signaling by adopting a beam corresponding to one TCI state identifier in response to the first configuration information indicating that the CORESET corresponds to one TCI state identifier or in response to the second configuration information indicating that one target CORESET is associated with the SS Set; or indicating the UE to receive the control signaling by adopting beams corresponding to two or more TCI state identifiers in response to the first configuration information indicating that the CORESET corresponds to the two or more TCI state identifiers or in response to the second configuration information indicating that tge two or more target CORESETs are associated with the SS Set;

wherein the TCI state identifier is carried in configuration information for the CORESET, and each CORESET corresponds to a respective TCI state identifier.

16. The method of claim 11, wherein sending the third configuration information for activating a link relation between association pairs in association pair group to the UE comprises at least one of:

sending a Radio Resource Control (RRC) signaling, a Medium Access Control Address Control Element (MAC CE) signaling, or a Downlink Control Information (DCI) signaling to the UE, wherein the RRC signaling, the MAC CE signaling or the DCI signaling carries group identifier information of an association pair group whose link relation need to be activated, the group identifier information corresponds to an identifier of the SS Set and a CORESET identifier of the CORESET associated with the SS Set in each association pair of the association pair group;

sending a Radio Resource Control (RRC) signaling and/ or a Medium Access Control Address Control Element (MAC CE) signaling to the UE, wherein the RRC signaling and/or the MAC CE signaling carries group identifier information of one or more association pair groups, the group identifier information corresponds to an identifier of the SS Set and a CORESET identifier of the CORESET associated with the SS Set in each association pair of the one or more association pair groups, wherein the MAC CE signaling is configured to indicate to the group identifier information of an association pair group whose link relation is activated; or sending a Radio Resource Control (RRC) signaling and/ or a Medium Access Control Address Control Element (MAC CE) signaling to the UE, wherein the RRC signaling and/or MAC CE signaling carries group identification information of one or more association pair groups, the group identification information corresponds to an identifier of the SS Set and a CORESET identifier of the CORESET associated with the SS Set in each association pair of the one or more association pair groups; and sending a Downlink Control Information (DCI) signaling to the UE, wherein the DCI signaling is configured to indicate group identifier information of an association pair group whose link relation is activated.

17. The method of claim 12, further comprising at least one of:

sending type indication information for indicating a type of resources occupied by the control signaling to the UE, wherein the type of the resources is a single-TCI-state transmission type or a multi-TCI-state transmission type; or sending an association relation between resources occupied by the control signaling sent by the network device, wherein a type of resources having an association is a multi-TCI-state transmission type, and a type of resources not having an association is a single-TCI-state transmission type.

18. The method of claim 17, wherein a granularity of the resources comprises at least one of:

Control Resource Set (CORESET);

Search Space Set (SS Set);

partial frequency resources of the CORESET;

PDCCH candidate;

Control Channel Element (CCE); or

Resource Element Group (REG) bundle.

19. A user equipment (UE), comprising:

at least one processor; and a memory, communicatively connected to the at least one processor;

wherein the at least one processor is configured to:

receive indication information sent by a network device, wherein the indication information is configured to indicate one or more target Transmission Configuration Indication (TCI) states used by the UE for receiving a control signaling carried on a Physical Downlink Control Channel (PDCCH); and receive the control signaling based on the indication information;

wherein the at least one processor is further configured to: receive second configuration information, sent by the network device, for a Search Space Set (SS Set), wherein the second configuration information is the indication information, the second configuration information is configured to indicate one or more target Control Resource Sets (CORESETs) associated with the SS Set, and one or more TCI state identifiers corresponding to the one or more target CORESETs are one or more target TCI state identifiers; or receive third configuration information, sent by the network device, for activating a link relation between association pairs in an association pair group, wherein the third configuration information is the indication information, each association pair comprises one Search Space Set (SS Set) and a Control Resource Set (CORESET) associated with the SS Set, the association pair group comprises at least two association pairs, an association pair group whose link relation is activated is a target association pair group, and one or more TCI state identifiers corresponding to one or more CORE-SETs contained in the association pair group are the one or more target TCI state identifiers.

20. A network device, comprising:

at least one processor; and a memory, communicatively connected to the at least one processor; wherein the at least one processor is configured to perform the method of claim 11.

* * * * *